United States Patent
Ackerman

[15] 3,666,760
[45] May 30, 1972

[54] IODINATED 3-AMINOBENZAMIDES
[72] Inventor: James H. Ackerman, Bethlehem, N.Y.
[73] Assignee: Sterling Drug Inc., New York, N.Y.
[22] Filed: Apr. 2, 1970
[21] Appl. No.: 25,262

Related U.S. Application Data

[63] Continuation-in-part of Ser. No. 808,653, Mar. 19, 1969, Pat. No. 3,609,147, and a continuation-in-part of Ser. No. 715,583, Mar. 25, 1968, abandoned, Ser. No. 808,653 is a continuation-in-part of Ser. No. 715,558, Mar. 25, 1968, abandoned, which is a continuation-in-part of Ser. No. 550,614, May 17, 1966, abandoned.

[52] U.S. Cl.............260/247.2 A, 260/243 B, 260/247.2 R, 260/247.5, 260/293.77, 260/326.3, 260/326.5, 260/470, 260/471 R, 260/471 A, 260/516, 260/518 R, 260/518 A, 260/519, 260/557 R, 260/578, 260/518 A, 424/5
[51] Int. Cl......................................................C07c 103/28
[58] Field of Search.................260/558, 294, 326.85, 247.2, 260/70, 557, 559

[56] References Cited

UNITED STATES PATENTS 3,446,837  5/1969  Wallingford..........................260/558

Primary Examiner—Henry R. Jiles
Assistant Examiner—Harry I. Moatz
Attorney—Elmer J. Lawson, B. Woodrow Wyatt, Thomas L. Johnson, Robert K. Bair, William G. Webb and Roger T. Wolfe

[57] ABSTRACT

3-Amino-2,4,6-triiodobenzoic acids optionally substituted in the 5-position by amino or carboxy or a derivative thereof react with dibasic acid anhydrides to give the corresponding cyclic imides (A), which can be hydrolyzed to the corresponding anilic acids (B). The latter can be further alkylated on the anilide nitrogen atom. Compounds A and B are useful as cholecystographic and urographic agents.

3 Claims, No Drawings

IODINATED 3-AMINOBENZAMIDES

This application is a continuation-in-part of my prior copending application, Ser. No. 808,653, filed Mar. 19, 1969, now U.S. Pat. No. 3,609,147, which is in turn a continuation-in-part of my prior application, Ser. No. 715,558, filed Mar. 25, 1968, now abandoned, which is in turn a continuation-in-part of my application, Ser. No. 550,614, filed May 17, 1966, now abandoned. This application is also a continuation-in-part of my prior application, Ser. No. 715,583, filed Mar. 25, 1968, now abandoned.

This invention relates to iodinated aniline derivatives and their preparation, and more particularly is concerned with iodinated benzene cyclic imide derivatives and the corresponding anilic acids, with intermediates therefor, and with methods for their preparation.

A preferred aspect of the invention resides in compounds of the formulas:

(A) and (B) [structures shown]

wherein Y is lower-alkylene group wherein two or three carbon atoms separate the carbonyl groups, vinylene, or a 1,3-propylene group wherein the two-carbon atom is replaced by O, S, SO or $SO_2$; Y' is a single bond, vinylene, or an alkylene bridge having from one to eight carbon atoms or such a group interrupted by from one to three members selected from O, S, SO and $SO_2$, said members, when more than one, being separated by at least two carbon atoms; Z is OH, O-lower-alkyl, lower-alkyl, phenyl, $NH_2$, NH(lower-alkyl), N(lower-alkyl)$_2$, morpholino, pyrrolidino or piperidino; R is H, $H_2N$, Z—CO,

[structure: Y–CO–N–CO ring]

HOOC—Y'—CO—NH, HOOC—Y'—CO—N(lower-alkyl), T—CO—NH, T—CO—NHCH$_2$, or (T—CO)N(lower-alkyl), where T is hydrogen, cycloalkyl of three to six ring members, or alkyl of one to eight carbon atoms optionally interrupted by from one to four oxygen atoms, each oxygen, when more than one, being separated by at least two carbon atoms; R' is hydrogen, lower-alkyl, hydroxy-lower-alkyl, lower-alkoxy-lower-alkyl, or lower-alkoxy-lower-alkoxy-lower-alkyl, except that in formula (B) at least one of R and R' is other than hydrogen; and R" is hydrogen or lower-alkyl.

In the above formulas (A) and (B), Y stands, inter alia, for a lower-alkylene group wherein two or three carbon atoms separate the carbonyl groups and thus can be an ethylene or propylene group optionally substituted by lower-alkyl. The group Y can have from two to six carbon atoms and includes such groups as —CH$_2$CH$_2$—, —CH$_2$CH$_2$CH$_2$—, —CH(CH$_3$)CH$_2$—, —CH$_2$CH(CH$_3$)CH$_2$—, —CH(CH$_3$)CH(CH$_3$)—, —CH$_2$CH(C$_2$H$_5$)CH$_2$—, —CH(CH$_3$)CH$_2$CH$_2$—, —CH(CH$_3$)CH(CH$_3$)CH(CH$_3$)—, —CH$_2$C(CH$_3$)$_2$CH$_2$—, and the like. Y also stands for a 2-oxa- or 2-thia-1,3-propylene group having from two to four carbon atoms, for example, —CH$_2$OCH$_2$—, —CH$_2$SCH$_2$—, —CH$_2$SOCH$_2$—, —CH$_2$SO$_2$CH$_2$—, —CH(CH$_3$)OCH$_2$—, —CH(CH$_3$)OCH(CH$_3$)—, and the like. The group Y' in formula B is not limited to a two or three carbon bridge but may have up to eight carbons separating the carbonyl and carboxyl groups.

In the above formulas A and B, when Z stands for O-lower-alkyl, lower-alkyl, NH(lower-alkyl) or N(lower-alkyl)$_2$, and/or R stands for HOOC—Y'—CO—N(lower-alkyl) or (T—CO)N (lower-alkyl), and/or R' stands for lower-alkyl, lower-alkoxy-lower-alkyl, or lower-alkoxy-lower-alkoxy-lower-alkyl, and/or R" stands for lower-alkyl, the lower-alkyl and lower-alkoxy groups have from one to six carbon atoms, thus including, for example, methyl, methoxy, ethyl, ethoxy, propyl, isopropyl, butyl, butyloxy, isobutyl, pentyl, hexyl and hexyloxy.

In the foregoing definitions, where T stands for cycloalkyl of three to six ring members, the cycloalkyl thus includes cyclopropyl, cyclobutyl, cyclopentyl, cyclohexyl, and lower-alkylated derivatives thereof, for example, 2-methylcyclopropyl, 3-ethylcyclopentyl, 3,4-dimethylcyclohexyl, and the like.

The method of preparation of the compounds of formulas A and B varies according to the structure desired as follows:

1. Compounds of formula A where R is H, Z—CO,

[structure: Y–CO–N–CO ring]

HOOC—Y—CO—N(lower-alkyl), T—CO—NHCH$_2$ or (T—CO)N(lower-alkyl).

a. Using a dibasic acid anhydride:
A compound of the formula (C) [structure shown]

wherein R° is H, Z-CO,

[structure: Y–CO–N–CO ring]

HOOC—Y—CO—N(lower-alkyl), T—CO—NH, T—CO—NHCH$_2$, or (T—CO)N(lower-alkyl), Z, T and Y having the same meanings given hereinabove, and Q is hydrogen or lower-alkanoyl, is heated with an acid anhydride of the formula

[structure: Y–CO–O–CO ring]

When Y is a lower-alkylene groups, the reaction is preferably carried out in the presence of a strong acid catalyst, for example, sulfuric acid or phosphoric acid. When the reaction is carried out with a compound of formula C wherein Q is lower-alkanoyl, the lower-alkanoyl group is lost and replaced by the cyclic imide group.

b. Using a succinyl or glutaryl chloride:
A compound of formula C where Q is hydrogen is heated with a compound of the formula Cl—OC—Y—CO—Cl, where Y is a lower-alkylene group wherein two or three carbon atoms separate the carbonyl groups, in an inert solvent.

2. Compounds of formula B where R' is hydrogen.
a. Where Y' is within the scope of Y, and R" is hydrogen:
These compounds can be prepared by alkaline hydrolysis of the corresponding compounds of formula A. The reaction takes place in aqueous solution under mild conditions, at room temperature.

b. Where R is as given under method 1) above:
These compounds can be prepared by reacting a compound of formula C where Q is hydrogen with a half ester half acid chloride, Cl—CO—Y'—CO—OR", in an inert solvent, affording a compound of formula B where R" is lower-alkyl. Hydrolysis of the latter under mild alkaline conditions gives an anilic acid of formula B where R" is hydrogen.

3. Compounds of formulas A and B wherein R is $NH_2$ or T—CO—NH.

These compounds can be prepared from 3-amino-5-nitrobenzoic acid or an ester or amide thereof according to the following flow sheet (Z and Y having the meanings given hereinabove):

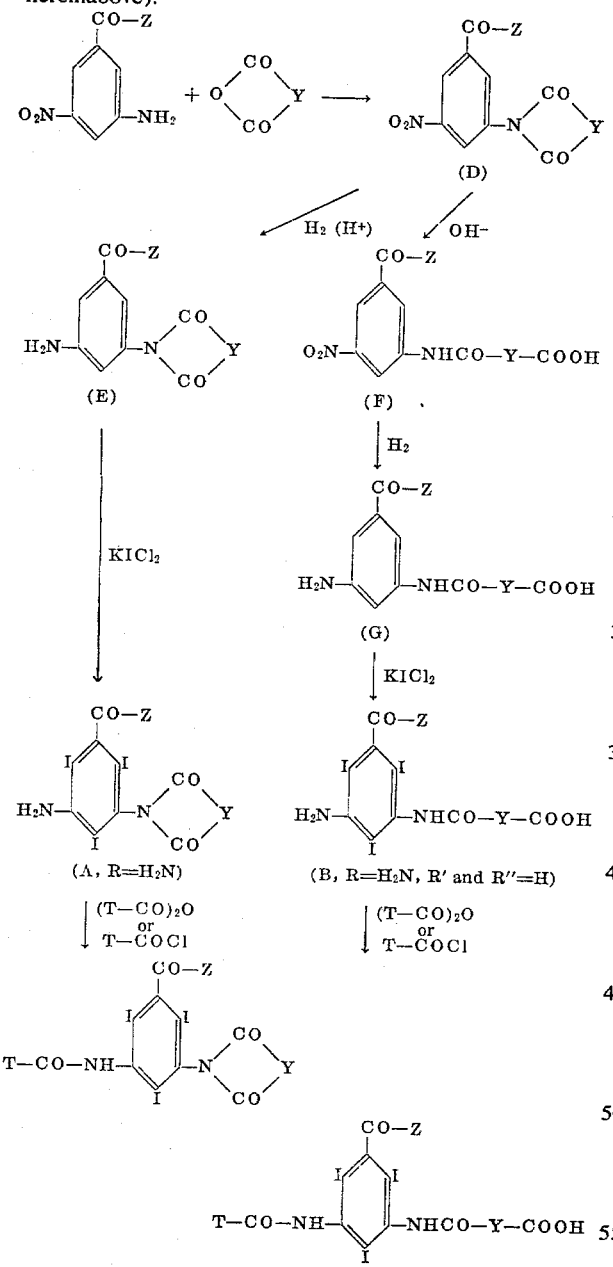

3-Amino-5-nitrobenzoic acid or an amide or ester thereof is reacted with an anhydride, $O(CO)_2Y$, to give the cyclic imide (D). The latter can either be hydrogenated under acid or neutral conditions to give the amino cyclic imide (E) or hydrolyzed under basic conditions to give the corresponding nitro-anilic acid (F). The nitro-anilic acid in turn can be hydrogenated to the amino-anilic acid (G). Iodination of the amino cyclic imide (E) affords a compound of formula A where R is $H_2N$, and iodination of the amino-anilic acid (G) gives a compound of formula B where R is $H_2N$ and R' is H. The primary amino groups can then, if desired, be acylated with an acid anhydride or acid chloride to give, respectively, a compound of formula A where R is T—CO—NH, or a compound of formula B where R is T—CO—NH and R' is hydrogen.

4. Compounds of formulas A and B where the groups in the 3- and 5-positions are identical.

These are most conveniently prepared from 3,5-diamino-2,4,6-triiodobenzoic acid, or an ester or amide thereof. The latter is reacted with at least two equivalents of an anhydride, $O(CO)_2Y$, to afford a compound of formula A where R is $Y(CO)_2N$, which then can be hydrolyzed to a compound of formula B where R is HOOC—Y—CONH and R' is H. The starting material can also consist of a 3-lower-alkanoylamino-5-amino-2,4,6-triiodobenzoic acid or a 3,5-bis(lower-alkanoylamino)benzoic acid. In the reaction with the anhydride the lower-alkanoyl groups are replaced by cyclic imide groups. Alternatively, a method analogous to method 2(b) above can be used, for example, reacting 3,5-diamino-2,4,6-triiodobenzoic acid with a half ester half acid chloride Cl—CO—Y'—CO—OR'', affording a compound of formula B where R is R''OCO—Y'—CONH, R' is H and R'' is lower-alkyl.

5. Compounds of formula B wherein R' is lower-alkyl, hydroxy-lower-alkyl, lower-alkoxy-lower-alkyl or lower-alkoxy-lower-alkoxy-lower-alkyl.

These compounds can be prepared by N-alkylation of the corresponding compounds where R' is hydrogen. The alkylation is effected by the action of R' halide, R' sulfate, R' alkylsulfonate or R' arylsulfonate in the presence of aqueous alkali, wherein R' is lower-alkyl, hydroxy-lower-alkyl, lower-alkoxy-lower-alkyl or lower-alkoxy-lower-alkoxy-lower-alkyl. If the starting material is a compound of formula B where R is T—CO—NH or HOOC—Y'—CO—NH, alkylation occurs on both nitrogens simultaneously.

6. Compounds of formulas A and B wherein R is (T—CO)N(lower-alkyl).

An alternative synthesis of these compounds is outlined in the following flow sheet:

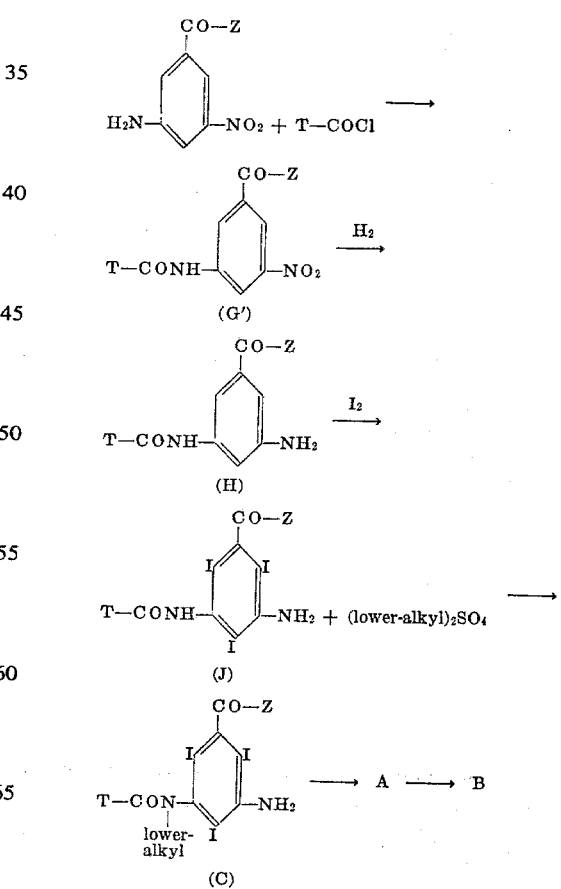

In the foregoing formulas T and Z have the meanings given hereinabove. 3-Amino-5-nitrobenzoic acid or a derivative thereof is treated with an acid chloride, T—COCl, to yield a nitro amide (G') which is catalytically reduced to an amino amide (H). The latter is iodinated to give a 2,4,6-triiodo-3-amino-5-acyl-amidobenzoic acid or derivative thereof (J) and finally alkylated on the amide nitrogen to produce a compound of formula C where R° is (T—CO)N(lower-alkyl). The latter can be converted to compounds of formulas A and B by the methods previously described.

The compounds of the invention of formulas A and B where Y and/or Y' are alkylene groups interrupted by SO or SO$_2$ can alternatively be prepared by oxidation of the corresponding sulfide (—S—) compounds with a peracid. The oxidation takes place at room temperature in an inert organic solvent.

The key reaction in the foregoing methods for preparing the compounds of the invention is the formation of the cyclic imide from the substituted aniline. Prior art methods for the preparation of N-aryl cyclic imides comprise the formation of the N-aryl-anilic acid followed by cyclodehydration of the latter to form the N-aryl cyclic imide. The present invention provides a process for preparing N-aryl cyclic imides from substituted anilines in a single step.

A process aspect of the invention thus resides in a process for preparing compounds of the formula

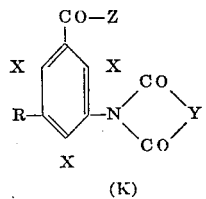

(K)

wherein R is H, Z-CO,

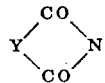

T—CO—NHCH$_2$, (T—CO)N(lower-alkyl), HOOC—Y—CO—N(lower-alkyl) or O$_2$N (Z and T having the meanings given above); Y is vinylene, a lower-alkylene group wherein two or three carbon atoms separate the carbonyl groups, or a 1,3-propylene group wherein the two-carbon atom is replaced by O, S, SO or SO$_2$; and X is H or I, X being H when R is O$_2$N, which comprises heating a compound of the formula

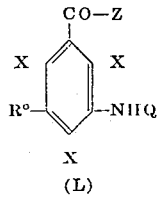

(L)

wherein R° is H, H$_2$N, Z-CO,

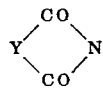

T—CO—NH, T—CO—NHCH$_2$, (T—CO)N(lower-alkyl), HOOC—Y—CO—N(lower-alkyl) or O$_2$N (Z and T having the meanings given above); Y is vinylene, a lower-alkylene group wherein two or three carbon atoms separate the carbonyl groups, or a 1,3-propylene group wherein the two-carbon atom is replaced by O, S, SO or SO$_2$; Q is hydrogen or lower-alkanoyl; and X is H or I, X being H when R° is O$_2$N, with a compound of the formula

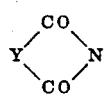

a strong acid catalyst preferably being used where Y is lower-alkylene. An equimolar quantity or an excess of the anhydride reactant is used, and the reactants are heated together at a temperature between about 50° and 150° C.

If desired, the cyclic imide of formula (K) can be hydrolyzed to the corresponding anilic acid of formula

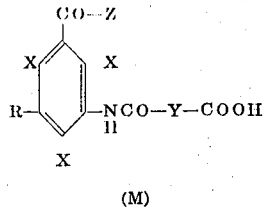

(M)

and the latter, if desired, where X is iodine, can be N-alkylated with R' halide, R' sulfate, R' alkylsulfonate or R' arylsulfonate, to give a compound of formula B wherein R' is lower-alkyl, hydroxy-lower-alkyl, lower-alkoxy-lower-alkyl or lower-alkoxy-lower-alkoxy-lower-alkyl.

The structures of the compounds of the invention were determined by the modes of synthesis, by elementary analysis and by neutral equivalent determinations. The course of the reactions was followed by thin-layer chromatography.

Those compounds of the invention which are carboxylic acids, can be obtained in the form of salts derived from inorganic bases or organic amines. The compounds of formula B where R'' is hydrogen and Z is OH, being dibasic acids, can form mono- or di-salts. Preferred salts are those which are pharmaceutically acceptable, for example, the sodium, magnesium, calcium and N-methylglucamine salts; although all salts are useful either as characterizing derivatives or as intermediates in the purification of the acids. The salt forms of the compounds of the invention are considered the full equivalents of the free acids claimed herein, and thus are part of the same inventive concept.

The compounds of the invention in the form of water-soluble, pharmaceutically acceptable salts are useful as intravenous X-ray contrast media either for visualization of the kidneys and urinary tract (urography) or of the gallbladder (cholecystography). The compounds of lower molecular weight, having from 11 to about 15 carbon atoms, are primarily urographic agents, whereas those of higher molecular weight and greater lipophilic character are primarily cholecystographic agents. The compounds have a low toxicity, intravenous LD$_{50}$ values ranging up to 20,000 mg./kg. in mice.

The actual quantitative determination of toxicity and radiopaque effectiveness for a particular compound is readily determined by standard test procedures by technicians trained in pharmacological test procedures, without the need for any extensive experimentation; Hoppe, J. Am. Pharmaceut. Assn. 48, 368–79 (1959); and Hoppe et al., Am. J. Roentgen. Rad. Therap. Nuc. Med. 69, 620–7 (1953).

The compounds of the invention were tested for their intravenous urographic or cholecystographic efficacy by standard procedure as follows: The test compound was injected intravenously in the form of an aqueous solution of the sodium or N-methylglucamine salt to the test animals, usually cats or rabbits. Each animal was X-rayed at hourly intervals and the roentgenograms examined and evaluated. The density of the organ shadows was interpreted in accordance with a numerical scoring plan designated as the Cholecystographic Index (CI) or Urographic Index (UI), a measure of the efficiency of the test compound, viz.: 0 (none), 1 (poor), 2 (fair), 3 (good), 4 (excellent). At a dose level of 100 mg./kg., the compounds of the invention having cholecystographic properties produced gallbladder shadows having a maximum Cholecystographic Index of 3.0–4.0.

The compounds of the invention are prepared for use by dissolving a pharmaceutically acceptable salt form in sterile aqueous medium suitable for intravenous injection.

The following examples will further illustrate the invention without the latter being limited thereby.

EXAMPLE 1

3-Glutarimido-5-(N-methylacetamido)-2,4,6-triiodobenzoic Acid [A; R is CH$_3$CON(CH$_3$), Y is CH$_2$CH$_2$CH$_2$, Z is OH].

A mixture of 117.2 g. of 3-amino-5-(N-methylacetamido)-2,4,6-triiodobenzoic acid and 182 g. of glutaric anhydride was heated with stirring on a steam bath. Concentrated sulfuric acid (10 ml.) was added, and heating and stirring were continued for 7 hours. The reaction mixture was added to 700 ml. of water, and the solid product was collected by filtration and recrystallized from acetic acid. The resulting 3-glutarimido-5-(N-methylacetamido)-2,4,6-triiodobenzoic acid was converted to its sodium salt form as follows: the free acid was slurried with 40 ml. of methanol and a 1N solution of sodium hydroxide in methanol was added with trituration until the solid had dissolved. The sodium salt was precipitated out with ether, and the resulting gun was triturated with ether and dissolved in methanol. The latter solution was decolorized with activated charcoal and the product reprecipitated with ether. The product was dissolved in water and the solution filtered and concentrated in vacuo. The residue was dried in vacuo to give the sodium salt of 3-glutarimido-5-(N-methylacetamido)-2,4,6-triiodobenzoic acid as a pale pink solid, m.p. 200°–204° C. (dec.).

When the glutaric anhydride in the foregoing preparation was replaced by glutaryl chloride in dioxane solution there was obtained a product in which 3-glutarimido-5-(N-methylacetamido)-2,4,6-triiodobenzoic acid could be identified by thin layer chromatography.

By replacing the 3-amino-5-(N-methylacetamido)-2,4,6-triiodobenzoic acid in the foregoing preparation by a molar equivalent amount of 3-amino-5-(N-butylacetamido)-2,4,6-triiodobenzoic acid, 3-amino-5-(N-methylpropionamido)-2,4,6-triiodobenzoic acid, 3-amino-5-(N-methylcaproylamino)-2,4,6-triiodobenzoic acid, 3-amino-5-(N,N-dimethylcarbamoyl)-2,4,6-triiodobenzoic acid, or 3-amino-5-(N-methyl-2-methoxyacetamido)-2,4,6-triiodobenzoic acid, there can be obtained, respectively, 3-glutarimido-5-(N-butylacetamido)-2,4,6-triiodobenzoic acid [A; R is $CH_3Con(C_4H_9)$, Y is $CH_2CH_2CH_2$, Z is OH], 3-glutarimido-5-(N-methylpropionamido)-2,4,6-triiodobenzoic acid [A; R is $CH_3CH_2CON(CH_3)$, Y is $CH_2CH_2CH_2$, Z is OH], 3-glutarimido-5-(N-methylcaproylamino)-2,4,6-triiodobenzoic acid [A; R is $CH_3(CH_2)_4CON(CH_3)$, Y is $CH_2CH_2CH_2$, Z is OH], 3-glutarimido-5-(N,N-dimethylcarbamoyl)-2,4,6-triiodobenzoic acid [A; R is $(CH_3)_2NCO$, Y is $CH_2CH_2CH_2$, Z is OH], or 3-glutarimido-5-(N-methyl-2-methoxyacetamido)-2,4,6-triiodobenzoic acid [A; R is $CH_3OCH_2CON(CH_3)$, Y is $CH_2CH_2CH$, Z is OH].

By replacing the glutaric anhydride in the foregoing preparation by a molar equivalent amount of 2,3-dimethylsuccinic anhydride, 2,3,4-trimethylglutaric anhydride, or 2-methylglutaric anhydride, there can be obtained, respectively, 3-(2,3-dimethylsuccinimido)-5-(N-methylacetamido)-2,4,6-triiodobenzoic acid [A; R is $CH_3CON(CH_3)$, Y is $CH(CH_3)CH(CH_3]$, 3-(2,3,4-trimethylglutarimido)-2,4,6-triiodobenzoic acid [A; R is $CH_3CON(CH_3)$, Y is $CH(CH_3)CH(CH_{33})$, Z is OH], or 3-(2-methylglutarimido)-2,4,6-triiodobenzoic acid [A; R is $CH_3CON(CH_3)$, Y is $CH(CH_3)CH_2CH_2$, Z is OH].

EXAMPLE 2

3-Succinimido-5-(N-methylacetamido)-2,4,6-triiodobenzoic Acid [A; R is $CH_3CON(CH_3)$, Y is $CH_2CH_2$, Z is OH] was prepared from 87.9 g. of 3-amino-5-(N-methylacetamido)-2,4,6-triiodobenzoic acid, 120 g. of succinic anhydride and 6 ml. of sulfuric acid according to the procedure of Example 1, except that a reaction temperature of 130°–140° C. was used. The reaction was essentially complete after 30 minutes heating time. The compound was isolated in the form of its sodium salt, pale yellow solid, m.p. 220°–222° C.(dec.).

EXAMPLE 3

3-(3-Methylglutarimido)-5-(N-methylacetamido)-2,4,6triiodo-benzoic Acid [A; R is $CH_3CON(CH_3)$, Y is $CH_2CH(CH_3CH_2$, Z is OH] was prepared from 3-amino-5-(N-methylacetamido)-2,4,6-triiodobenzoic acid, 3-methylglutaric anhydride and sulfuric acid according to the procedure of Example 1. The product was isolated in the free acid form, m.p. 301°–302° C. (dec.) when recrystallized from acetic acid.

EXAMPLE 4

3,5-bis(Glutarimido)-2,4,6-triiodobenzoic Acid [A; R is $(CH_2)_3(CO)_2N$, Y is $CH_2CH_2CH_2$, Z is OH].

a. From 3,5-diamino-2,4,6-triiodobenzoic acid. A mixture of 265 g. of 3,5-diamino-2,4,6-triiodobenzoic acid, 400 g. of glutaric anhydride and 18 ml. of concentrated sulfuric acid was heated at 100° C. and stirred for 17 hours. The product was isolated and recrystallized from dimethyl sulfoxide, adding water to induce precipitation, and was obtained as a light gray solid with one mole of dimethyl sulfoxide of crystallization, m.p. above 300° C. A sample of the acid was converted to its sodium salt form, m.p. 288°–291° C. (dec.) when recrystallized from water.

b. From 3-acetamido-5-amino-2,4,6-triiodobenzoic acid. A mixture of 11.4 g. of 3-acetamido-5-amino-2,4,6-triiodobenzoic acid, 23 g. of glutaric anhydride and 1 ml. of concentrated sulfuric acid was heated on a steam bath for 2 ½ hours. The reaction mixture was stirred with water and the product (14.4 g.) collected by filtration. The product was recrystallized twice from acetone to give 3,5-bis(glutarimido)-2,4,6-triiodobenzoic acid. The same compound is obtained if the 3-acetamido-5-amino-2,4,6-triiodobenzoic acid is replaced by 3,5-diacetamido-2,4,6-triiodobenzoic acid.

The following compounds were prepared following the procedure of Example 1 from the appropriate 3-amino-5-R-2,4,6-triiodobenzoic acid and acid anhydride:

Example 5: 3-(3,3-Dimethylglutarimido)-5-(N-methylacetamido)-2,4,6-triiodobenzoic Acid [A; R is $CH_3CON(CH_3$, Y is $CH_2C(CH_3)_2CH_2$, Z is OH], pale tan solid, m.p. 274°–278° C.(dec.) (from acetic acid); sodium salt form, pale yellow solid, m.p. 235°–245° C.(dec.).

Example 6: 3-Glutarimido-5-(N-ethylacetamido)-2,4,6-triiodobenzoic Acid [A; R is $CH_3CON(C_2H_5)$, Y is $CH_2CH_2CH_2$, Z is OH], sodium salt form, m.p. above 220° C.

Example 7: 3-(Methylsuccinimido)-5-(N-methylacetamido)-2,4,6-triiodobenzoic Acid [A; R is $CH_3CON(CH_3)$, Y is $CH(CH_3)CH_2h_2$, Z is OH], m.p. 285°–287° C. (from acetic acid); sodium salt form, m.p. above 245° C.(dec.).

Example 8: 3-(Diglycolimido)-5-(N-methylacetamido)-2,4,6-triiodobenzoic Acid [A; R is $CH_3CON(CH_3)$, Y is $CH_2OCH_2$, Z is OH], sodium salt form, m.p. 250°–255° C. No sulfuric acid was used in this preparation.

Example 9: 3-(3,5-Dioxothiomorpholino)-5-methylacetamido)-2,4,6-triiodobenzoic Acid [A; R is $CH_3CON(CH_3$, Y is $Ch_2SCH_2$, Z is OH], sodium salt form, beige solid, m.p. 250°–260° C.(dec.). No sulfuric acid was used in this preparation.

3-(3,5-Dioxothiomorpholino)-5-(N-methylacetamido)-2,4,6-triiodobenzoic acid can be oxidized with m-chloroperbenzoic acid in dimethylformamide solution to give 3-(3,5,S,S-tetraoxothiomorpholino)-5-(N-methylacetamido)-2,4,6-triiodobenzoic acid [A; R is $CH_3CON(CH_3)$, Y is $CH_2SO_2CH$, Z is OH].

Example 10: 3-Glutarimido-2,4,6-triiodo-N-methylisophthalamic Acid [A; R is $CH_3NHCO$, Y is $CH_2CH_2CH$, Z is OH], sodium salt form, light tan solid, m.p. 250°–270° C.(dec.) when recrystallized from aqueous methanol with addition of ether.

Example 11: 3-Succinimido-2,4,6-triiodo-N-methylisophthalamic Acid [A; R is $CH_3NHCO$, Y is $CH_2CH_2$, Z is OH], m.p. above 300° C.; sodium salt form, pale pink solid, m.p. 258°–261° C.

Example 12: 5-Glutarimido-2,4,6-triiodoisophthalic Acid [A; R is HOOC, Y is $CH_2CH_2CH_2$, Z is OH], m.p. above 300° C.; disodium salt form, white solid, m.p. above 300° C.

Example 13: 3-Succinimido-2,4,6-triiodobenzoic Acid [A; R is H, Y is $CH_2CH_2$, Z is OH], colorless prisms, m.p. 279°–281° C. (from acetic acid).

Example 14: 3-(3,5-Dioxothiomorpholino)-2,4,6-triiodobenzoic Acid [A; R is H, Y is CH$_2$SCH$_2$, Z is OH], sodium salt form, light tan solid, m.p. 274°–284° C.(dec.).

Example 15: 3-(Diglycolimido)-2,4,6-triiodobenzoic Acid [A; R is H, Y is CH$_2$OCH$_2$, Z is OH], sodium salt form, light beige solid, m.p. 274°–281° C.(dec.).

Example 16: 3-Glutarimido-2,4,6-triiodobenzoic Acid [A; R is H, Y is CH$_2$CH$_2$CH$_2$, Z is OH], pale pink solid, m.p. 250°–251.5° C. (from acetic acid); sodium salt form, light lavender solid, m.p. 249°–252.5° C.

Example 17: 3-Succinimidobenzoic Acid [K; R is H, X is H, Y is CH$_2$CH$_2$, Z is OH], m.p. 237°–239° C.; sodium salt form, m.p. 151°–196° C.

Example 18: 3-Glutarimidobenzoic Acid [K; R is H, X is H, Y is CH$_2$CH$_2$CH$_2$, Z is OH], m.p. 272°–275° C.; sodium salt form, m.p. about 110° C.

EXAMPLE 19

3'-Carboxy-5'-(N-methylacetamido)-2', 4', 6'-triiodoglutaranilic Acid [B; R is CH$_3$CON(CH$_3$), R' and R" are H, Y' is CH$_2$CH$_2$CHB2, Z is OH].

A mixture of 58.6 g. of 3-amino-5-(N-methylacetamido)-2,4,6-triiodobenzoic acid, 74 g. of glutaric anhydride and 8 ml. of concentrated sulfuric acid was heated on a steam bath for 5 hours. The reaction mixture was poured into water and the solid product collected by filtration. The product, consisting of 3-glutarimido-5-(N-methylacetamido)-2,4,6-triiodobenzoic acid (Example 1) was dissolved in excess dilute aqueous sodium hydroxide, and the solution warmed for 30 minutes, then cooled and 3N hydrochloric acid added slowly until precipitation was complete. The solid product was collected and recrystallized first from acetone, then from acetic acid, and finally from water to give 3'-carboxy-5'-(N-methylacetamido)-2', 4', 6'-triiodoglutaranilic acid, colorless prisms, m.p. 188.8°–196.0° C.

Similarly, by warming in dilute aqueous sodium hydroxide, 3-glutarimido-5-(N-butylacetamido)-2,4,6-triiodobenzoic acid, 3-glutarimido-5-(N-methylpropionamido)-2,4,6-triiodobenzoic acid, 3-glutarimido-5-(N-methylcaproylamino)-2,4,6-triiodobenzoic acid, 3-glutarimido-5-(N,N-dimethylcarbamoyl)-2,4,6-triiodobenzoic acid, 3-(2,3-dimethylsuccinimido)-5-(N-methylacetamido)-2,4,6-triiodobenzoic acid, 3-(2,3,4-trimethylglutarimido)-5-(N-methylacetamido)-2,4,6-triiodobenzoic acid, 3-(2-methylglutarimido)-5-(N-methylacetamido)-2,4,6-triiodobenzoic acid, 3-(3-methylglutarimido)-5-(N-methylacetamido)-2,4,6-triiodobenzoic acid, or 3-glutarimido-5-(N-methyl-2-methoxyacetamido)-2,4,6-triiodobenzoic acid can be hydrolyzed, respectively, to 3'-carboxy-5'-(N-butylacetamido)-2', 4', 6'-triiodoglutaranilic acid [B; R is Ch$_3$CON(C$_4$H$_9$), R' and R" are H, Y' is CH$_2$ CH$_2$CH$_2$, Z is OH], 3'-carboxy-5'-(N-methylpropionamido)-2', 4', 6'-triiodoglutaranilic acid [B; R is CH$_3$CH$_2$CON(CH$_3$), R' and R" are H, Y' is CH$_2$ CH$_2$CH$_2$, Z is OH], 3'-carboxy-5' -(N-methylcaproylamino)-2', 4', 6'-triiodoglutaranilic acid [B; R is CH$_3$(CH$_2$)$_4$CON(CH$_3$), R' and R" are H, Y' is CH$_2$CH$_2$ CH$_2$, Z is OH], 3'-carboxy-5'-(N,N-dimethylcarbamoyl)-2', 4', 6'-triiodoglutaranilic acid [B; R is (CH$_3$)$_2$NCO, R' and R" are H, Y' is CH$_2$CH$_2$CH$_2$, Z is OH], 3'-carboxy-5'-(N-methylacetamido)-2', 4', 6'-triiodo-2,3-dimethylsuccinanilic acid [B; R is CH$_3$CON(CH$_3$), R' and R" are H, Y' is CH(CH$_3$)CH(CH$_3$), Z is OH], 3'-carboxy-5'-(N-methylacetamido)-2', 4', 6'-triiodo-2,3,4-trimethylglutaranilic acid [B; R is CH$_3$CON(CH$_3$), R' and R" are H, Y' is CH(CH$_3$)CH(CH$_{33}$), Z is OH], 3'-carboxy-5'-(N-methylacetamido)-2', 4', 6'-triiodo-2(or 4)-methylglutaranilic acid [B; R is CH$_3$CON(CH$_3$), R' and R" are H, Y' is CH(CH$_3$)CH$_2$h$_2$or CH$_2$CH$_2$CH(CH$_3$), Z is OH], 3'-carboxy-5'-(N-methylacetamido)-2', 4', 6'-triiodo-3-methylglutaranilic acid [B; R is CH$_3$CON(CH$_3$), R' and R" are H, Y' is CH$_2$CH(CH$_3$CH$_2$, Z is OH], or 3'-carboxy-5'-(N-methyl-2-methoxyacetamido)-2', 4', 6'-triiodoglutaranilic acid [B; R is CH$_3$OCH$_2$CON(CH$_3$), R' and R" are H, Y' is CH$_2$CH$_2$CH$_2$, Z is OH].

3'-Carboxy-5'-(N-methylacetamido)-2', 4', 6'-triiodoglutaranilic acid can also be prepared by heating 3-amino-5-(N-methylacetamido)-2,4,6-triiodobenzoic acid with 4-carbomethoxybutyryl chloride (CH$_3$OCOCH$_2$CH$_2$CH$_2$COCl) in dioxane solution, followed by hydrolysis of the resulting methyl 3'-carboxy-5'-(N-methylacetamido)-2', 4', 6'-triiodoglutaranilate by heating it with potassium carbonate in methanol solution.

Similarly, 3-amino-5-(N-methylacetamido)-2,4,6-triiodobenzoic acid can be caused to react with Cl—COCH$_2$CH$_{22}$CH$_2$COOCH$_3$, Cl—COCH$_2$CH$_2$OCH$_2$CH$_2$OOCH$_3$ or Cl—COCH$_2$SCH$_2$CH$_2$CH$_2$SCH$_2$COOCH$_3$ to give, respectively, the following compounds: [B; R is CH$_3$CON(CH$_3$, R' is H, R" is CH$_3$, Y' is CH$_2$CH$_2$CH$_2$CH$_2$, Z is OH]; [B; R is CH$_3$CON(CH$_3$), R' is H, R" is CH$_3$, Y' is CH$_2$CH$_2$OCH$_2$CH$_2$, Z is OH]; or [B; R is CH$_3$CON(CH$_3$), R' is H, R" is CH$_3$, Y' is CH$_2$SCH$_2$CH$_2$CH$_2$SCH$_2$, Z is OH]. These can be hydrolyzed to the corresponding acids where R" is hydrogen. In the same manner, 3,5-diamino-2,4,6-triiodibenzoic acid can be caused to react with Cl—COCH$_2$CH$_{22}$CH$_2$COOCH$_3$ to give [B; R is CH$_3$OCOCH$_2$C H$_2$CH$_2$CH$_2$CONH, R' is H, R" is CH$_3$, Y' is CH$_2$CH$_2$CH$_2$CH$_2$, Z is OH], which can be hydrolyzed to give [B; R is HOCOCH$_2$CH$_2$h$_2$CH$_2$CONH, R' and R" are H, Y' is CH$_2$CH$_2$CHB2CH$_2$, Z is OH].

EXAMPLE 20

3'-Carboxy-5'-(N-methylacetamido)-2', 4', 6'-triiodosuccinanilic Acid [B; R is CH$_3$CO, R' and R" are H, Y' is CH$_2$CH$_2$, Z is OH] was prepared from 34.3 g. of 3-amino-5-(N-methylacetamido)-2,4,6-triiodobenzoic acid, 82 g. of succinic anhydride and 5 ml. of concentrated sulfuric acid, followed by alkaline hydrolysis of the resulting 3-succinimido-5-(N-methylacetamido)-2,4,6-triiodobenzoic acid, according to the method described in Example 19. The product was recrystallized from dilute ethanol and from a methanol-acetonitrile mixture and further purified by converting it to the diammonium salt by means of ammonium hydroxide in methanol, and then acidifying an aqueous solution of the ammonium salt to regenerate the free acid. There was thus obtained 3'-carboxy-5'-(N-methylacetamido)-2',4',6'-triiodosuccinanilic acid, m.p. 275.0°–276.0° C. (dec. ).

EXAMPLE 21

3-[2-(Carboxymethylsulfonyl)acetamido]-2,4,6-triiodo-5-(N-methylacetamido)benzoic Acid [B; R is CH$_3$CON(CH$_3$), R' and R" are H, Y' is CH$_2$SO$_2$CH$_2$, Z is OH].

A solution of 26.1 g. of 3-amino-5-(N-methylacetamido)-2,4,6-triiodobenzoic acid in 300 ml. of dioxane was distilled until about 60 ml. of dioxane was removed in order to eliminate possible traces of water. Sulfonyldiacetyl chloride (ClCOCH$_2$SO$_2$CH$_2$COCl) (5.85 g.) was then added, and the mixture was stirred and refluxed for about 5 days. The reaction mixture was concentrated in vacuo to remove the solvent, and the residue was dissolved in dilute sodium hydroxide to give a solution of the sodium salt of the product. The basic solution was made weakly acid, which did not cause precipitation of the acid form of the product, treated with activated charcoal at 60° C. and filtered. The filtrate was acidified with 3N hydrochloric acid and the precipitated product collected. The acid product was purified by dissolving it in ammonium hydroxide solution and reacidifying the resulting ammonium salt solution. The acid product was recrystallized from aqueous dimethylformamide to give 3-[2-(carboxymethylsulfonyl)acetamido]-2,4,6-triiodo-5-(N-methylacetamido)benzoic acid, m.p. above 300° C.

By replacing the sulfonyldiacetyl chloride in the foregoing preparation by sulfoxydiacetyl chloride (ClCOCH$_2$—SO-CH$_2$COCl) there can be obtained 3[2-(carboxymethyl-sulfoxy)acetamido]-2,4,6-triiodo-5-(N-methylacetamido)benzoic acid [B; R is CH$_3$CON(CH$_3$), R' and R" are H, Y' is CH$_2$SOCH$_2$, Z is OH].

The following compounds were prepared either by mild alkaline hydrolysis of the corresponding cyclic imides, or directly from the appropriate 3-amino-5-R-2,4,6-triiodobenzoic acid without isolation of the intermediate cyclic imide as described above in Examples 19 and 20.

Example 22: 3'-Carboxy-2',4',6'-triiodo-3-methyl-5'-(N-methylacetamido)glutaranilic Acid [B; R is CH$_3$CON(CH$_3$), R' and R'' are H, Y' is CH$_2$CH(CH$_3$)CH$_2$, Z is OH], colorless crystals, m.p. 256°–259° C. (dec.).

Example 23: 3,5-bis(4-Carboxybutyramido)-2,4,6-triiodobenzoic Acid [B; R is HOOC(CH$_2$)$_3$CONH, R' and R'' are H, Y' is CH$_2$CH$_2$CH$_2$, Z is OH], colorless solid, m.p. 251°–253° C. (from acetic acid).

Example 24: 3'-Carboxy-2',4',6'-triiodo-3,3-dimethyl-5'-(N-methylacetamido)glutaranilic Acid [B; R is CH$_3$CON(CH$_3$), R' and R'' are H, Y' is CH$_2$C(CH$_3$)$_2$CH$_2$, Z is OH], colorless crystals, m.p. 258°–262° C. (dec.).

Example 25: 3'-Carboxy-5'-(N-ethylacetamido)-2',4',6'-triiodoglutaranilic Acid [B; R is CH$_3$CON(C$_2$H$_5$), R' and R'' are H, Y' is CH$_2$CH$_2$CH$_2$, Z is OH], colorless solid, m.p. 250° C. (dec.).

Example 26: 3'-Carboxy-2',4',6'-triiodo-3-methyl-5'-(N-methyl-acetamido)succinanilic Acid [B; R is CH$_3$CON(CH$_3$), R' and R'' and H, Y' is CH(CH$_3$)CH$_2$, Z is OH], light orange solid, m.p. 262°–264° C. (dec.).

Example 27: 3'-Carboxy-2',4',6'-triiodo-5'-(N-methylacetamido)-diglycolanilic Acid [B; R is CH$_3$CON(CH$_3$), R' and R'' are H, Y' is CH$_2$OCH$_2$, Z is OH], disodium salt form, light tan solid, m.p. 245°–260° C. (dec.).

Example 28: 3-[2-(Carboxymethylthio)acetamido]-2,4,6-triiodo 5-(N-methylacetamido)benzoic Acid [B; R is CH$_3$CON(CH$_3$, R' and R'' are H, Y' is CH$_2$SCH$_2$, Z is OH], beige solid m.p. 165°–170° C.

Example 29: 3'-Carboxy-2',4',6'-triiodo-5'-methylcarbamoyl-glutaranilic Acid [B; R is CH$_3$NHCO, R' and R'' are H, Y' is CH$_2$CH$_2$CHB$_2$, Z is OH], pale pink prisms, m.p. 249°–252° C. (dec.).

Example 30: 5'-(4-Carboxybutyramido)-2,4,6-triiodoisophthalic Acid [B; R is HOOC, R' and R'' are H, Y' is CH$_2$CH$_2$CH$_2$, Z is OH], colorless solid, m.p. 238° C. (dec.).

Example 31: 3'-Carboxy-2',4',6'-triiodosuccinanilic Acid [B; R, R' and R'' are H, Y' is CH$_2$CH$_2$, Z is OH], colorless prisms, m.p. 237°–239° C.(dec.).

Example 32: 3-[2-(Carboxymethylthio)acetamido]-2,4,6-triiodobenzoic Acid [B; R, R' and R'' are H, Y' is CH$_2$SCH$_2$, Z is OH], colorless solid m.p. 237°–240° C.

Example 33: 3'-Carboxy-2',4', 6'-triiododiglycolanilic Acid [B; R, R' and R'' and H, Y' is CH$_2$OCH$_2$, Z is OH], colorless solid, m.p. 231°–234° C.

Example 34: 3'-Carboxy-2',4',6'-triiodoglutaranilic Acid [B; R, R' and R'' are H, Y' is CH$_2$CH$_2$CH$_2$, Z is OH], colorless crystals, m.p. 249°–250° C.

Example 35: 3'-Carboxysuccinanilic Acid [M; R is H, X is H, Y is CH$_2$CH$_2$, Z is OH], colorless solid, m.p. 223°–225° C.

Example 36: 3'-Carboxyglutaranilic Acid [M; R is H, X is H, Y is CH$_2$CH$_2$CH$_2$, Z is OH], pale tan crystals m.p. 221°–224° C.

EXAMPLE 37 a. 3-Succinimido-5-nitrobenzoic Acid [D; Y is CH$_2$CH$_2$, Z is OH] was prepared by heating 3-amino-5-nitrobenzoic acid with succinic anhydride in the presence of sulfuric acid. It had the m.p. 285°–290° C. when recrystallized from aqueous dimethylformamide.

b. 3'-Carboxy-5'-nitrosuccinanilic Acid [F; Y is CH$_2$CH$_2$, Z is OH] was prepared by treating 3-succinimido-5-nitrobenzoic acid with warm dilute aqueous sodium hydroxide, and had the m.p. 220°–221° C.

c. 3'-Carboxy-5'-aminosuccinanilic Acid [G; Y is CH$_2$CH$_2$, Z is OH].

3'-Carboxy-5'-nitrosuccinanilic acid (83.5 g.) and 50 ml. of concentrated ammonium hydroxide in 100 ml. of water were added to a heated solution of 540 g. of ferrous sulfate heptahydrate in 900 ml. of water. Concentrated ammonium hydroxide (100 ml.) was then added during 15 minutes in 50 ml. portions. After 30 minutes of heating on a steam bath, the reaction mixture was filtered and made acid to pH 3.5. The product was collected and dried in vacuo over phosphorus pentoxide to give 57.5 g. of 3'carboxy-5'-aminosuccinanilic acid, m.p. 194° C.(dec.).

d. 3'-Carboxy-5'-amino-2',4',6'-triiodosuccinanilic Acid [B; R is NH$_2$, R' and R'' and H, Y' is CH$_2$CH$_2$, Z is OH].

Potassium iododichloride (335 ml. 2.23N in water), was added over a period of 40 minutes to a stirred suspension of 57.3 g. of 3'carboxy-5'-aminosuccinanilic acid in 435 ml. of water. The solid product was collected by filtration and recrystallized from water and from aqueous dimethylformamide. The product was purified by converting it to the diammonium salt and then to the disodium salt, m.p. 222°–225° C. (dec.). The latter was acidified to produce the free acid form of 3'carboxy-5'-amino-2',4',6'-triiodosuccinanilic acid, cream colored solid, m.p. 156.2°–172.2° C.(dec.).

3'-Carboxy-5'-amino-2',4',6'-triiodosuccinanilic acid can be acylated with acetic anhydride, using a few drops of perchloric acid as a catalyst to obtain 3'-carboxy-5'-acetamido-2',4',6'-triiodosuccinanilic acid [B; R is CH$_3$CONH, R' and R'' are H, Y' is CH$_2$CH$_2$, Z is OH].

EXAMPLE 38 a. 3Glutarimido-5-nitrobenzoic Acid [D; Y is CH$_2$CH$_2$CH$_2$, Z is OH] was prepared by heating a mixture of 18.2 g. of 3-amino-5-nitrobenzoic acid, 45.6 g. of glutaric anhydride and 0.5 ml. of concentrated sulfuric acid on a steam bath for 2 hours. The product was isolated and recrystallized from aqueous dimethylformamide to give 3glutarimido-5-nitrobenzoic acid, pale yellow prisms, m.p. above 300° C.

b. 3'-Carboxy-5'nitroglutaranilic Acid [F; Y is CH$_2$CH$_2$CH$_2$, Z is OH] was prepared by warming gently a solution of 5.0 g. of 3-glutarimido-5-nitrobenzoic acid in excess 10 percent aqueous sodium hydroxide. The solution was acidified with 3N hydrochloric acid and the product collected and recrystallized from ethyl acetate to give 3'-carboxy-5'- nitroglutaranilic acid, pale yellow prisms, m.p. 182°–184° C.

c. 3'-Carboxy-5'-aminoglutaranilic Acid [G; Y is CH$_2$CH$_2$CH$_2$, Z is OH].

3-Glutarimido-5-nitrobenzoic acid (55.6 g.) was dissolved in 150 ml. of 10 percent aqueous sodium hydroxide, the pH adjusted to 8 with 3N hydrochloric acid, 1.0 g. of 10 percent palladium-on-carbon catalyst added, and the mixture hydrogenated in a Parr apparatus. Reduction was complete in 5 hours. The reaction mixture was filtered and the filtrate containing 3'-carboxy-5'-aminoglutaranilic acid iodinated as described below.

d. 3'-Carboxy-5'-amino-2',4',6'-triiodoglutaranilic Acid [B; R is H$_2$N, R' and R'' are H, Y' is CH$_2$CH$_2$CH$_2$, Z is OH].

The filtrate containing 3'-carboxy-5'-aminoglutaranilic acid was diluted with water to 800 ml. and 100 ml. of 6N hydrochloric acid added, followed by 500 ml. of 1.28N sodium iododichloride. The reaction mixture was stirred for about 16 hours, sodium bisulfite solution added to destroy excess iodine and the solid product collected. The latter was converted to its diammonium salt with ammonium hydroxide in isopropyl alcohol, the salt collected, dissolved in water, and the solution acidified with hydrochloric acid. The free acid was collected and dried at 60° C. to give 3'-carboxy-5'-amino-2',4',6'-triiodoglutaranilic acid, m.p. 219°–221° C. (dec.).

EXAMPLE 39 a. 3-Glutarimido-5-aminobenzoic Acid [E; Y is CH$_2$CH$_2$CH$_2$, Z is OH] can be prepared by reduction of 3-glutarimido-5-nitrobenzoic acid (Example 38a). The reduction can be carried out catalytically (platinum or nickel catalyst) under neutral or acidic conditions.

b. 3-Glutarimido-5-amino-2,4,6-triiodobenzoic Acid [A; R is H$_2$N, Y is CH$_2$CH$_2$CH$_2$, Z is OH] can be prepared by iodination of 3-glutarimido-5-aminobenzoic acid with potassium iododichloride according to the procedure described in Example 37, part (d).

c. 3-Glutarimido-5acetamido-2,4,6-triiodobenzoic Acid [A: R is CH$_3$COHN, Y is CH$_2$CH$_2$CH$_2$, Z is OH] can be prepared by acetylation of 3-glutarimido-5-amino-2,4,6-triiodobenzoic acid with acetic anhydride, using a few drops of perchloric acid as a catalyst.

EXAMPLE 40 a. 3'-Carboxy-5'-nitrodiglycolanilic Acid [F; Y is CH$_2$OCH$_2$, Z is OH], pale yellow prisms, m.p. 216°–219° C. (from water), was prepared from 3-amino-5-nitrobenzoic acid and diglycolic anhydride.

b. 3'-Carboxy-5'-aminodiglycolanilic Acid [G; Y is CH$_2$OCH$_2$, Z is OH] was prepared by hydrogenation of 3-carboxy-5-nitrodiglycolanilic acid with palladium-on-carbon catalyst. It was iodinated in the following step without purification.

c. 3'-Amino-5'-carboxy-2',4',6'-triiododiglycolanilic Acid [B; R is H$_2$N, R' and R'' are H, Y' is CH$_2$OCH$_2$, Z is OH], pale cream-gray prisms, m.p. 220°–223° C. (dec.) (from acetic acid), was prepared by iodination of 3-carboxy-5-aminodiglycolanilic acid with potassium iododichloride.

EXAMPLE 41

3'-Carboxy-5'-amino-2',4',6'-triiodo-N-methylglutaranilic Acid [B; R is H$_2$N, R' is CH$_3$, R'' is H, Y' is CH$_2$CH$_2$CH$_2$, Z is OH].

To a solution of 26.0 g. of 3'-carboxy-5'-amino-2',4',6'-triiodoglutaranilic acid (Example 38, part d) in 100 ml. of 10 percent aqueous sodium hydroxide cooled in an ice bath was added 8 ml. of dimethyl sulfate in acetone. After 3 hours of stirring an additional 15 ml. of 10 percent sodium hydroxide and 2 ml. of dimethyl sulfate were added and the mixture stirred 3 hours longer. The reaction mixture was acidified, and the product collected and recrystallized from acetic acid to give 3'-carboxy-5'-amino-2', 4',6'-triiodo-N-methylglutaranilic acid, pale gray crystals, m.p. 218°–220° C. (dec.).

EXAMPLE 42

3'-Carboxy-5'-glutarimido-2',4',6'-triiodo-N-methylglutaranilic Acid [A; R is HOOC(CH$_2$)$_3$CON(CH$_3$), Y is CH$_2$CH$_2$CH, Z is OH] was prepared from 3'-carboxy-5'-amino-2',4',6'-triiodo-N-methylglutaranilic acid (Example 41) and glutaric anhydride according to the procedure of Example 1. The free acid was obtained as a colorless solid, m.p. 160°–161° C. when recrystallized from acetic acid, and the disodium salt form as a beige solid, m.p. 252°–255° C.

EXAMPLE 43

3'-Carboxy-5'-(N-methylacetamido)-2',4',6'-triiodo-N-methylglutaranilic Acid [B; R is CH$_3$CON(CH$_3$), R' is CH$_3$, R'' is H, Y' is CH$_2$CH$_2$CH$_2$, Z is OH] was prepared from 49.0 g. of 3'-carboxy-5'-(N-methylacetamido)-2',4',6'-triiodoglutaranilic acid (Example 19) and 15 ml. of dimethyl sulfate in 175 ml. of 10 percent sodium hydroxide according to the procedure of Example 41. The product was recrystallized from acetic acid, using ethyl acetate to bring the compound out of solution. There was thus obtained 3'-carboxy-5'-(N-methylacetamido)-2',4',6'-triiodo-N-methylglutaranilic acid, colorless prisms, m.p. 284°–287° C. (dec.).

EXAMPLE 44

3'-Carboxy-5'-(N-methylacetamido)-2',4', 6'-triiodo-N-ethylglutaranilic Acid [B; R is CH$_3$CON(CH$_3$), R' is C$_2$H$_5$, R'' is H, Y' is CH$_2$CH$_2$CH$_2$, Z is OH] was prepared from 56,3 g. of 3'-carboxy-'-N-methylacetamido)-2',4',6'-triiodoglutaranilic acid (Example 19) and 40 ml. of diethyl sulfate in 10 percent sodium hydroxide solution according to the procedure of Example 41. The product was recrystallized from acetic acid and from an acetic acid-ethyl acetate mixture to give 3'-carboxy-5'-(N-methylacetamido)-2',4',6'-triiodo-N-ethylglutaranilic acid, m.p. 259°–261° C. (dec.).

3'-Carboxy-5'-(N-methylacetamido)-2',4',6'-triiodoglutaranilic acid can similarly be alkylated with n-butyl iodide, 2-hydroxyethyl bromide, 2-ethoxyethyl bromide or 2-(2-ethoxyethoxy)ethyl p-toluenesulfonate to give 3'-carboxy-5'-(N-methylacetamido)-2',4',6'-triiodo-N-butylglutaranilic acid [B; R is CH$_3$CON(CH$_3$), R' is C$_4$H$_9$, R'' is H, Y' is CH$_2$CH$_2$CH$_2$, Z is OH], 3'-carboxy-5'-(N-methylacetamido)-2',4',6'-triiodo-N-(2-hydroxyethyl)glutaranilic acid [B; R is CH$_3$CON(CH$_3$, R' is HOCH$_2$CH$_2$, R'' is H, Y' is CH$_2$CH$_2$CH$_2$, Z is OH]; 3'-carboxy-5'-(N-methylacetamido)-2',4',6'-triiodo-N-(2-ethoxyethyl)glutaranilic acid [B; R is CH$_3$CON(CH$_3$, R' is C$_2$H$_5$OCH$_2$CH$_2$, R'' is H, Y' is CH$_2$CH$_2$CH, Z is OH] or 3'-carboxy-5'-(N-methylacetamido)-2',4',6'-triiodo-N-[2-(2-ethoxyethoxy)ethyl]glutaranilic acid [B; R is CH$_3$CON(CH$_3$), R' is C$_2$H$_5$OCHCH$_2$OCH$_2$CH$_2$, R'' is H, Y' is CH$_2$CH$_2$CH$_2$, Z is OH].

According to the procedure of Example 41, the following compounds were prepared:

Example 45: 3'-Carboxy-2',4',6'-triiodo-3,N-dimethyl-5'-(N-methylacetamido)glutaranilic Acid [B; R is CH$_3$CON(CH$_3$), R' is CH$_3$, R'' is H, Y' is CH$_2$CH(CH$_3$)CH$_2$, Z is OH], colorless solid, m.p. 221°–222° C. (from acetic acid), prepared by methylation of 3'-carboxy-2',4',6'-triiodo-3-methyl-5'-(N-methylacetamido)-glutaranilic acid (Example 22).

Example 46: 3,5,-bis(4-Carboxy-N-methylbutyramido)-2,4,6-triiodobenzoic Acid [B; R is HOOC(CH$_2$)$_3$CON(CH$_3$), R' is CH$_3$, R'' is H, Y' is CH$_2$CH$_2$CH$_2$, Z is OH], colorless prisms, m.p. 234°–236° C. (from acetic acid), prepared by methylation of 3,5-bis(4-carboxybutyramido)-2,4,6-triiodobenzoic acid (Example 23).

Example 47: 3'-Carboxy-2',4',6'-triiodo-N-methyl-5'-(N-methyl-acetamido)diglycolanilic Acid [B; R is CH$_3$CON(CH$_3$) R' is CH$_3$, R'' is H, Y' is CH$_2$OCH$_2$, Z is OH], colorless solid, m.p. 267°–272° C., prepared by methylation of 3'-carboxy-2',4',6'-triiodo-5'-(N-methylacetamido)diglycolanilic acid (Example 27).

Example 48: 3-[2-(Carboxymethylthio)-N-methylacetamido]-2,4,6-triiodo-5-(N-methylacetamido)benzoic Acid [B; R is CH$_3$CON(CH$_3$, R' is CH$_3$, R'' is H, Y' is CH$_2$SCH$_2$, Z is OH], light tan solid, m.p. 260°–265° C. (dec.), prepared by methylation of 3-[2-(carboxymethylthio)acetamido]-2,4,6-triiodo-5-(N-methylacetamido)benzoic acid (Example 28).

Example 49: 3'-Carboxy-2',4',6'-triiodo-N-methylglutaranilic Acid [B; R is H, R' is CH$_3$, R'' is H, Y' is CH$_2$CH$_2$CH$_2$, Z is OH], colorless solid, m.p. 230°–231° C. (from acetic acid), prepared by methylation of 3'-carboxy-2',4',6'-triiodoglutaranilic acid (Example 34).

Example 50: 3'-Carboxy-2',4',6'-triiodo-N-methylsuccinanilic Acid [B; R is H, R' is CH$_3$, R'' is H, Y' is CH$_2$CH$_2$, Z is OH], colorless solid, m.p. 245°–249° C. (from acetonitrile), prepared by methylation of 3'-carboxy-2',4',6'-triiodosuccinanilic acid (Example 31).

Example 51: 3'-Carboxy-2',4',6'-triiodo-5'-(N-methylacetamido)-3,3,N-trimethylglutaranilic Acid [B; R is CH$_3$CON(CH$_3$), R' is CH$_3$, R'' is H, Y' is CH$_2$C(CH$_3$)$_2$CH$_2$, Z is OH], m.p. 183°–184.5° C., prepared by methylation of 3'-carboxy-2',4',6'-triiodo-3,3-dimethyl-5'-(N-methylacetamido)glutaranilic acid (Example 24).

EXAMPLE 52

Methyl 3'-carboxy-2',4',6'-triiodo-5'-(N-methylacetamido)-adipanilate [B; R is CH$_3$CON(CH$_3$), R' is H, R'' is CH$_3$, Y' is (CH$_2$)$_4$, Z is OH].

A mixture of 98.4 g. of adipic acid monomethyl ester and 500 ml. of thionyl chloride was refluxed for 1 hour. The excess thionyl chloride was then removed in vacuo, and the last traces of thionyl chloride were removed by adding benzene and concentrating the solution. To the residue was added 260 g. of 3-amino-5-(N-methylacetamido)-2,4,6-triiodobenzoic acid in 3,500 ml. of dioxane. The mixture was refluxed for about 36 hours and allowed to stand for 2 days at room temperature. The solid product was collected and recrystallized from acetic acid to give methyl 3'-carboxy-2',4',6'-triiodo-5'-(N-methylacetamido)-adipanilate as a colorless solid, m.p. 229°–232° C.

Methyl 3'-carboxy-2', 4',6'-triiodo-5'-(N-methylacetamido)adipanilate was obtained in the form of its sodium salt by treating the free acid with methanolic sodium hydroxide. The sodium salt had the m.p. 264°–267° C. (dec.).

EXAMPLE 53

3'-Carboxy-2',4',6'-triiodo-5'-(N-methylacetamido)adipanilic Acid [B; R is $CH_3CON(CH_3)$, R' and R'' are H, Y' is $(CH_2)_4$, Z is OH].

To a mixture of 143.8 g. of methyl 3'-carboxy-2',4',6'-triiodo-5'-(N-methylacetamido)adipanilate (Example 52) and 150 ml. of water was added dropwise 145 ml. of 10 percent sodium hydroxide solution. The reaction mixture was heated on a steam bath for 2 hours and then cooled and acidified with 3N hydrochloric acid solution. The solid product was collected and recrystallized from acetic acid to give 3'-carboxy-2',4',6'-triiodo-5'-(N-methylacetamido)adipanilic acid in the form of a colorless solid, m.p. 267°–271° C. (dec.).

EXAMPLE 54

3'-Carboxy-2',4',6'-triiodo-N-methyl-5-(N-methylacetamido)-adipanilic Acid [B; R is $CH_3CON(CH_3)$, R' is $CH_3$, R'' is H, Y' is $(CH_2)_4$, Z is OH] was prepared by methylation of 3'-carboxy-2',4',6'-triiodo-5'-(N-methylacetamido)adipanilic acid (Example 53) with dimethyl sulfate according to the procedure described in Example 41. The product was purified through the sodium salt and then recrystallized from acetic acid to give 3'-carboxy-2',4',6'-triiodo-N-methyl-5-(N-methylacetamido)adipanilic acid in the form of a colorless solid, m.p. 194°–204° C.

EXAMPLE 55

2,4,6-Triiodo-3- 3-[2-(methoxycarbonyl)ethylthio]propionamido -5-(N-methylacetamido)benzoic Acid [B; R is $CH_3CON(CH_3)$, R' is H, R'' is $CH_3$, Y' is $CH_2CH_2SCH_2CH_2$, Z is OH] was prepared from 225 g. of 3-amino-5-(N-methylacetamido)-2,4,6-triiodobenzoic acid and 80.52 g. of $ClCOCH_2CH_2SCH_2CH_2COOCH_3$ in 1,170 ml. of dioxane according to the procedure described above in Example 52. The product was recrystallized from a methanol-acetonitrile mixture and was obtained as a colorless solid, m.p. 230°–240° C. (dec.).

The sodium salt form of 2,4,6-triiodo-3- 3-[2-(methoxycarbonyl)ethylthio]propionamido -5-(N-methylacetamido)benzoic acid, prepared from the free acid and methanolic sodium hydroxide, was obtained as a colorless solid, m.p. 220°–270° C.

EXAMPLE 56

3-[3-(2-Carboxyethylthio)propionamido]-2,4,6-triiodo-5-(N-methylacetamido)benzoic Acid [B; R is $CH_3CON(CH_3)$, R' and R'' are H, Y' is $CH_2CH_2SCH_2CH_2$, Z is OH] was prepared by hydrolysis of 2,4,6-triiodo-3- 3-[2-(methoxycarbonyl)ethylthio]propionamido -5-(N-methylacetamido)benzoic acid (Example 55) with sodium hydroxide according to the procedure described above in Example 53, and was obtained as a yellow solid, m.p. 228°–243° C. (dec.).

EXAMPLE 57

Methyl 3'-carboxy-2',4',6'-triiodo-5'-(N-methylacetamido)-azelanilate [B; R is $CH_3CON(CH_3)$, R' is H, R'' is $CH_3$, Y' is $(CH_2)_7$, Z is OH].

A mixture of 100 g. of azelaic acid monomethyl ester and 500 ml. of thionyl chloride was refluxed for 1 hour. The excess thionyl chloride was removed by distillation and the last traces removed by adding benzene and evaporating the solvent. A solution of 260 g. of 3-amino-5-acetamido-2,4,6-triiodobenzoic acid in 3,500 ml. of dioxane was then added to the resulting acid chloride of azelaic acid monomethyl ester, and the mixture was refluxed for 6 hours. The dioxane was then removed by distillation and the residual product recrystallized from acetic acid to give methyl 3'-carboxy-2',4',6'-triiodo-5'-(N-methyl-acetamido)azelanilate, as colorless needles, m.p. 198°–203° C.

By replacing the azelaic acid monomethyl ester by a molar equivalent amount of oxalic acid monomethyl ester or malonic acid monomethyl ester, there can be obtained, respectively, methyl 3'-carboxy-2',4',6'-triiodo-5'-(N-methylacetamido)oxalanilate ]B; R is $CH_3CON(CH_3)$, R' is H, R'' is $CH_3$, Y' is single bond, Z is OH], or methyl 3'-carboxy-2',4',6'-triiodo-5'-(N-methylacetamido)malonanilate [B; R is $CH_3CON(CH_3)$, R' is H, R'' is $CH_3$, Y' is $CH_2$, Z is OH].

The sodium salt form of methyl 3'-carboxy-2',4', 6'-triiodo-5'-(N-methylacetamido)azelanilate was obtained in the form of a colorless solid, m.p. 197°–204° C. (dec.).

EXAMPLE 58

3'-Carboxy-2',4',6'-triiodo-5'-(N-methylacetamido)azelanilic Acid [B; R is $CH_3CON(CH_3)$, R' and R'' are H, Y' is $(CH_2)_7$, Z is OH].

A mixture of 136.5 g. of methyl 3'-carboxy-2',4',6'-triiodo-5'-(N-methylacetamido)azelanilate and 180 ml. of water was treated with 10 percent aqueous sodium hydroxide (about 140 ml.), added dropwise until solution was complete. The mixture was heated on a steam bath for 10 minutes, 18 ml. more of 10 percent sodium hydroxide was added, and the mixture heated 1 hour longer. The reaction mixture was cooled, acidified with 3 percent hydrochloric acid, and the solid product collected, washed with water, dried and recrystallized from acetic acid to give 3'-carboxy-2',4',6'-triiodo-5'-(N-methylacetamido)azelanilic acid as a colorless solid, m.p. 205°–208° C.

By replacing the methyl 3'-carboxy-2',4',6'-triiodo-5'-(N-methylacetamido)azelanilate by a molar equivalent amount of methyl 3'-carboxy-2',4',6'-triiodo-5'-(N-methylacetamido)-oxalanilate or methyl 3'-carboxy-2',4',6'-triiodo-5'-(N-methyl-acetamido)malonanilate there can be obtained, respectively, 3'-carboxy-2',4',6'-triiodo-5'-(N-methylacetamido)oxalanilic acid [B; R is $CH_3CON(CH_3)$, R' and R'' are H, Y' is single bond, Z is OH] or 3'-carboxy-2',4', 6'-triiodo-5'-(N-methylacetamido)-malonanilic acid [B; R is $CH_3CON(CH_3)$, R' and R'' are H, Y' is $CH_2$, Z is OH].

EXAMPLE 59

3'-Carboxy-2',4',6'-triiodo-N-methyl-5'-(N-methylacetamido)-azelanilic Acid [B; R is $CH_3CON(CH_3)$, R' is $CH_3$, R'' is H, Y' is $(CH_2)_7$, Z is OH] was prepared by methylation of 3'-carboxy-2',4',6'-triiodo-5'-(N-methylacetamido)azelanilic acid (Example 58) with dimethyl sulfate according to the procedure of Example 41, and was obtained as a colorless solid, m.p. 210°–215° C., when recrystallized from ethyl acetate.

EXAMPLE 60

N-[2,4,6-Triiodo-3-(acetylaminomethyl)-5-carboxyphenyl]glutarimide [A; R is $CH_3CONHCH_2$, Y is $CH_2CH_2CH_2$, Z is OH] was prepared by interacting 3-acetamido-5-acetamidomethyl-2,4,6-triiodobenzoic acid with glutaric anhydride according to the method of Example 1 and was obtained in the form of a colorless solid, m.p. 256°–268° C., when recrystallized from acetic acid.

The sodium salt form of N-[2,4,6-triiodo-3-(acetylaminomethyl)-5-carboxyphenyl]glutarimide was obtained as a colorless solid, m.p. 252°–256° C.

EXAMPLE 61

N-[2,4,6-Triiodo-3-(acetylaminomethyl)-5-carboxyphenyl]glutaramic Acid [B; R is $CH_3CONHCH_2$, R' and R" are H, Y' is $CH_2CH_2CH_2$, Z is OH] was prepared by hydrolysis of N-[2,4,6-triiodo-3-(acetylaminomethyl)-5-carboxyphenyl]glutarimide (Example 60) with dilute sodium hydroxide, and was obtained in the form of a colorless solid, m.p. 234°–239° C. when recrystallized from acetic acid.

EXAMPLE 62

N-[2,4,6-Triiodo-3-(acetylaminomethyl)phenyl]-N-methylglutaramic Acid [B; R is $CH_3CONHCH_2$, R' is $CH_3$, R" is H, Y' is $CH_2CH_2CH_2$, Z is OH] was prepared by methylation of N-[2,4,6-triiodo-3-(acetylaminomethyl)-5-carboxyphenyl]glutaramic acid (Example 61) with dimethyl sulfate according to the procedure described in Example 41, and was obtained in the form of a colorless solid, m.p. 276°–280° C. when recrystallized from aqueous dimethylformamide.

EXAMPLE 63

2,4,6-Triiodo-3-maleimido-5-(N-methylacetamido)benzoic Acid [A; R is $CH_3CON(CH_3)$, Y is CH=CH, Z is OH] was prepared from 60 g. of 3-amino-5-(N-methylacetamido)-2,4,6-triiodobenzoic acid and 234.4 g. of maleic anhydride according to the procedure described above in Example 1, and was obtained as a colorless solid, m.p. 312° C. (dec.) when recrystallized from methanol.

2,4,6-Triiodo-3-maleimido-5-(N-methylacetamido)-benzoic acid can be hydrolyzed with dilute sodium hydroxide to give 3'-carboxy-5-(N-methylacetamido)-2',4',6'-triiodomaleanilic acid [B; R is $CH_3CON(CH_3)$, R' and R" are H, Y' is CH=CH, Z is OH].

EXAMPLE 64 a. 3-Amino-2,4,6-triiodo-5-(N-methylacetamido)-N,N-dimethyl-benzamide [C; R° is $CH_3CON(CH_3)$, Q is H, Z is $N(CH_3)_2$].

The acid chloride (16.23 g.) prepared from 3-amino-5-(N-methylacetamido)-2,4,6-triiodobenzoic acid and thionyl chloride was interacted with 60 ml. of dimethylamine (40 percent in water), 20 ml. of 35 percent aqueous sodium hydroxide and 30 ml. of water. The product was isolated and recrystallized from isopropyl alcohol to give 3-amino-2,4,6-triiodo-5-(N-methylacetamido)-N,N-dimethylbenzamide as a pale yellow solid, m.p. 235°–240° C.

b. 3-Glutarimido-2,4,6-triiodo-5-(N-methylacetamido)-N,N-dimethylbenzamide [A; R is $CH_3CON(CH_3)$, Y is $CH_2CH_2CH_2$, Z is $N(CH_3)_2$] was prepared from 3-amino-2,4,6-triiodo-5-(N-methylacetamido) -N,N-dimethylbenzamide and glutaric anhydride according to the procedure described above in Example 1, and was obtained as a colorless solid, m.p. 299°–303° C. when recrystallized from aqueous dimethylformamide.

EXAMPLE 65

3'-(Dimethylcarbamoyl)-2',4',6'-triiodo-5'-(N-methylacetamido)-glutaranilic Acid [B; R is $CH_3CON(CH_3)$, R' and R" are H, Y' is $CH_2CH_2CH_2$, Z is $N(CH_3)_2$] was prepared by hydrolysis of 3-glutarimido-2,4,6-triiodo-5-(N-methylacetamido)-N,N-dimethylbenzamide (Example 64, part b) with dilute sodium hydroxide according to the procedure of Example 19, and was obtained as a colorless solid, m.p. 265°–268° C. when recrystallized from acetic acid.

EXAMPLE 66

3'-(Dimethylcarbamoyl)-2',4',6'-triiodo-5'-(N-methylacetamido)-N-methylglutaranilic Acid [B; R is $CH_3CON(CH_3)$, R' is $CH_3$, R" is H, Y' is $CH_2CH_2CH_2$, Z is $N(CH_3)_2$] was prepared by methylation of 3'-(dimethylcarbamoyl)-2',4',6'5'-(N-methylacetamido)-glutaranilic acid (Example 65) with dimethyl sulfate according to the procedure of Example 41, and was obtained as a colorless solid, m.p. 209°–214° C.

EXAMPLE 67

2,4,6-Triiodo-3-(N-methylacetamido)-5-(3-methylglutarimido)- N,N-dimethylbenzamide [A; R is $CH_3CON(CH_3)$, Y is $CH_2CH(CH_3)CH_2$, Z is $N(CH_3)_2$] was prepared from 3-amino-5-(N-methylacetamido)- 2,4,6-triiodobenzoic acid and 3-methylglutaric anhydride according to the procedure described in Example 1, and was obtained as a colorless solid, m.p. 275°–282° C. when recrystallized from acetic acid.

EXAMPLE 68

3'-(Dimethylcarbamoyl)-2',4',6',-triiodo-5'-(N-methylacetamido)- 3-methylglutaranilic Acid [B; R is $CH_3CON(CH_3)$, R' and R" are H, Y'is $CH_2CH(CH_3)CH_2$, Z is $N(CH_3)_2$] was prepared by hydrolysis of 2,4,6-triiodo-3-(N-methylacetamido)-5-(3-methylglutarimido)- N,N-dimethylbenzamide (Example 67) with dilute sodium hydroxide according to the procedure described in Example 19, and was obtained as a colorless solid, m.p. 244°–254° C. when recrystallized from isopropyl alcohol.

EXAMPLE 69 a. 4-[3-Amino-2,4,6-triiodo-5-(N-methylacetamido)benzoyl]-morpholine [C; R° is $CH_3CON(CH_3)$, Q is H, Z is morpholino] was prepared from the acid chloride of 3-amino-5-(N-methylacet-amido)-2,4,6-triiodobenzoic acid and morpholine according to the procedure described in Example 64, part (a). The product obtained was used directly in the procedure described in part (b) below.

By replacing the morpholine by piperidine or pyrrolidine there can be obtained, respectively, 1-[3-amino-2,4,6-triiodo-5-(N-methylacetamido)benzoyl]piperidine [C; R° is $CH_3CON(CH_3)$, Q is H, Z is piperidino] or 1-[3-amino-2,4,6-triiodo-5-(N-methylacetamido)benzoyl]pyrrolidine [C; R° is $CH_3CON(CH_3)$, Q is H, Z is pyrrolidino].

b. 4-[3-Glutarimido-2,4,6-triiodo-5-(N-methylacetamido)-benzoyl]morpholine [A; R is $CH_3CON(CH_3)$, Y is $CH_2CH_2CH_2$, Z is morpholino] was prepared from 4-[3-amino-2,4,6-triiodo-5-(N-methylacetamido)benzoyl] morpholine and glutaric anhydride according to the procedure of Example 1, and was obtained as a colorless solid, m.p. 293°–299° C. when recrystallized from acetic acid.

By replacing the 4-[3-amino-2,4,6-triiodo-5-(N-methylacetamido)benzoyl]morpholine by 1-[3-amino-2,4,6-triiodo-5-(N-methylacetamido)benzoyl]piperidine or 1-[3-amino-2,4,6-triiodo-5-(N-methylacetamido)benzoyl]pyrrolidine, there can be obtained, respectively, 1-[3-glutarimido-2,4,6-triiodo-5-(N-methylacetamiodo)benzoyl]piperidine [A; R is $CH_3CON(CH_3)$, Y is $CH_2CH_2CH_2$, Z is piperidion] or 1-[3-glutarimido-2,4,6-triiodo-5-(N-methyl-acetamido)benzoyl] pyrrolidine [A; R is $CH_3CON(CH_3)$, Y is $CH_2CH_2CH_2$, Z is pyrrolidino].

EXAMPLE 70

2',4',6'-Triiodo-3'-(N-methylacetamido)-5'-(morpholinocarbonyl)-glutaranilic Acid [B; R is $CH_3CON(CH_3)$, R' and R" are H, Y' is $CH_2CH_2CH_2$, Z is morpholino] was prepared by hydrolysis of 4-[3-glutarimido-2,4,6-triiodo-5-(N-methylacetamido)benzoyl]morpholine (Example 69, part b) with dilute sodium hydroxide according to the procedure of Example 19, and obtained as a colorless solid, m.p. 281°–284° C. (dec.) when recrystallized from acetic acid.

By replacing the 4-[3-glutarimido-2,4,6-triiodo-5-(N-methylacetamido)benzoyl]morpholine by 1-[3-glutarimido-2,4,6-triiodo-5-(N-methylacetamido)benzoyl]piperidine or 1-[3-glutarimido-2,4,6-triiodo-5-(N-methylacetamido)benzoyl]-pyrrolidine there can be obtained, respectively, 2',4',6'-triiodo-3'-(N-methylacetamido)-5'-(piperidinocarbonyl)-glutaranilic acid [B; R is $CH_3CON(CH_3)$, R' and R" are H, Y' is $CH_2CH_2CH_2$, Z is piperidino] or 2',4',6'-triiodo-3'-(N-methyl-acetamido)-5'-(pyrrolidinocarbonyl)glutaranilic acid [B; R is $CH_3CON(CH_3)$, R' and R" are H, Y' is $CH_2CH_2CH_2$, Z is pyrrolidino].

EXAMPLE 71

2',4',6'-Triiodo-3'-(N-methylacetamido)-5'-(morpholinocarbonyl)-N-methylglutaranilic Acid [B; R is CH₃CON(CH₃), R' is CH₃, R'' is H, Y' is CH₂CH₂CH₂, Z is morpholino] was prepared by methylation of 2',4',6'-triiodo-3'-(N-methylacetamido)-5'-(morpholinocarbonyl)glutaranilic acid (Example 70) with dimethyl sulfate according to the procedure of Example 41, and was obtained in the form of colorless crystals, m.p. 251°–257° C.

EXAMPLE 72

3,5-bis(Glutarimido)-2,4,6-triiodo-N-methylbenzamide [A; R is glutarimido, Y is CH₂CH₂CH₂, Z is NHCH₃] was prepared from the acid chloride of 3,5-bis(glutarimido)-2,4,6-triiodobenzoic acid) from the compound of Example 4 and thionyl chloride) and aqueous methylamine solution according to the procedure described in Example 64, part (a), and was obtained in the form of pale tan prisms, m.p. 271°–272° C. (dec.) when recrystallized from acetic acid.

EXAMPLE 73

N,N'-[2,4,6-Triiodo-5-(methylcarbamoyl)-m-phenylene]bis(glutar-amic Acid) [B; R is HOOC(CH₂)₃CONH, R' and R'' are H, Y' is CH₂CH₂CH₂, Z is NHCH₃] was prepared by hydrolysis of 3,3-bis-(glutarimido)-2,4,6-triiodo-N-methylbenzamide (Example 72) with ethanolic sodium hydroxide, 10 minutes at 100° C., and was obtained in the form of colorless crystals, m.p. 269°–270° C. (dec.) when recrystallized from aqueous dimethylformamide.

EXAMPLE 74

3,5-bis(Glutarimido)-2,4,6-triiodo-N,N-dimethylbenzamide [A; R is glurarimido, Y is CH₂CH₂CH₂, Z is N(CH₃)₂] was prepared from the acid chloride of 3,5-bis(glutarimido)-2,4,6-triiodobenzoic acid (Example 4) and aqueous dimethylamine according to the procedure of Example 64, part (a), and was obtained in the form of colorless crystals, m.p. above 340° C. when recrystallized from acetonitrile.

EXAMPLE 75

N,N'-[2,4,6-Triiodo-5-(dimethylcarbamoyl)-m-phenylene]bis(glutar-amic Acid) [B; R is HOOC(CH₂)₃CONH, R' and R'' are H, Y' is CH₂CH₂CH₂, Z is N(CH₃)₂] was prepared by hydrolysis of 3,5-bis(glutarimido)-2,4,6-triiodo-N,N-dimethylbenzamide (Example 74) with sodium hydroxide, and was obtained as a colorless solid, m.p. 244°–246°C.

EXAMPLE 76

3,5-bis(Succinimido)-2,4,6-triiodobenzoic Acid [A; R is succinimido, Y is CH₂CH₂, Z is OH] was prepared from 50 g. of 3,5-diacetamido-2,4,6-triiodobenzoic acid and 150 g. of succinic anhydride in the presence of 5 ml. of concentrated sulfuric acid, 30 minutes at 134° C., and was obtained in the form of pale cream crystals, m.p. above 300° C. when recrystallized from acetic acid.

EXAMPLE 77

N,N'-(5-Carboxy-2,4,6-triiodo-m-phenylene)disuccinamic Acid [B; R is HOOCH₂CH₂CONH, R' and R'' are H, Y' is CH₂CH₂, Z is OH] was prepared by hydrolysis of 3,5-bis(succinimido)-2,4,6-triiodobenzoic acid (Example 76) with dilute sodium hydroxide, and was obtained in the form of pale tan crystals, m.p. 229°–230° C. (dec.) when recrystallized from acetic acid.

EXAMPLE 78 a. 5-Amino-2,4,6-triiodo-N,N,N',N'-tetramethylisophthalamide ]C; R° is (CH₃)₂NCO, Q is H, Z is N(CH₃)₂].

A mixture of 66.80 g. of 3-amino-2,4,6triiodoisophthalic acid and 200 ml. of thionyl chloride was heated with stirring on a hot water bath (75° C.) for 30 minutes. The excess thionyl chloride was removed by concentration in vacuo, and by adding benzene and evaporating the solvent. To the residue was slowly added 200 ml. of dimethylamine (40 percent in water), followed by a mixture of 66 ml. of 35 percent aqueous sodium hydroxide and 66 ml. of water. The reaction mixture was stirred for 80 minutes and the solid product was collected and fractionally crystallized from methanol to obtain 5-amino-2,4,6-triiodo-N,N,N',N'-tetramethylisophthalamide in two isomeric forms; Isomer A, colorless solid, m.p. 244°–260° C. and Isomer B, beige crystals, m.p. 264°–267°C.

b. 3-Glutarimido-2,4,6-triiodo-N,N,N',N'-tetramethyisophthalamide [A; R is (CH₃)₂NCO, Y is CH₂CH₂CH₂, Z is N(CH₃)₂]. Isomer A. m.p. 315°–321 °C. (fine colorless needles from methanol) were prepared from 5-amino-2,4,6-triiodo-N,N,N',N'-tetramethylisophthalamide (Example 78, part a), Isomers A and B, respectively, and glutaric anhydride according to the procedure of Example 1.

EXAMPLE 79

3',5'-bis(Dimethylcarbamoyl)-2'4',6'-triiodoglutaranilic Acid [B; R is (CH₃)₂NCO, R' and R'' are H, Y' is CH₂CH₂CH₂, Z is N(CH₃)₂], Isomer A, m.p. 277°–281° C. (colorless solid from methanol), and Isomer B, m.p. 274°–275° C., were prepared by hydrolysis of 3-glutarimido-2,4,6-triiodo-N,N,N',N'-tetramethylisophthalamide (Example 78, part b), Isomers A and B, respectively, with dilute sodium hydroxide.

EXAMPLE 80

3',5'-bis(Dimethylcarbamoyl)-2',4',6'-triiodooxalanilic Acid [B; R is (CH₃)₂NCO, R' and R'' are H, Y' is single bond Z is N(CH₃)₂].

A mixture of 30.0 g. of 5-amino-2,4,6-triiodo-N,N,N',N'-tetramethylisophthalamide (Isomer A) (Example 78a) and 30 ml. of ethyl oxalyl chloride in 200 ml. of dioxane was stirred for 90 minutes. The solid product was collected and warmed with excess 10 percent aqueous sodium hydroxide at 70° C. for 20 minutes. The hydrolysis mixture was colled and acidified with hydrochloric acid, and the product collected to give 3',5'-bis-(dimethylcarbamoyl)-2',4',6'-triiodooxalanilic acid (Isomer A) in the form of a colorless solid, m.p. 204°–209 °C.

Similarly, 5-amino-2,4,6-triiodo-N,N,N',N'-tetramethylisohthalamide (Isomer B) was converted to 3',5'-bis-(dimethylcarbamoyl)-2',4',6'-triiodooxalanilic acid (Isomer B) in the form of colorless needles, m.p. 201°–211°C.

EXAMPLE 81

Dimethyl 5amino-2,4,6-triiodoisophthalate [C; R° is CH₃OOC, Q is H, Z is OCH₃].

The acid chloride prepared from 25 g. of 5-amino-2,4,6-triiodiosopthalic acid and thionyl chloride was dissolved in 150 ml. of dry benzene and 2.5 g. of sodium methoxide was added. The reaction mixture was stirred at room temperature and the resulting product isolated to give dimethyl 5-amino-2,4,6-triiodoisophthalate as a tan solid, m.p. 163°–166°C.

By replacing the sodium methoxide by sodium ethoxide there was prepared diethyl 5-amino-2,4,6-triiodoisophthalate, tan prisms, m.p. 145°–150°C.

Dimethyl 5-amino-2,4,6-triiodoisophthalate can be interacted with glutaric anhydride according to the procedure of Example 1 to give dimethyl 3-glutarimido-2,4,6-triiodoisophthalate [A; R is CH₃OOC, Y is CH₂CH₂CH₂, Z is OCH₃]. The latter can be hydrolyzed with dilute sodium hydroxide to give first 3',5'-dicarbomethoxy-2',4'36'-triiodoglutaranilic acid [B; R is CH₃OOC, R' and R'' are H, Y' is CH₂CH₂CH₂, Z is OCH₃]and then 3',5'-dicarboxy-2',4',6'-triiodoglutaranilic acid [B; R is HOOC, R' and R'' are H, Y' is CH₂CH₂Chbh2, Z is OH ](Example 30).

EXAMPLE 82 a. 5-Amino-2,4,6-triiodo-N,N', -dimethylisophthalamide [C; R° is CH₃NHCO, Q is H, Z is NHCH₃] was prepared from the acid chloride of 5-amino-2,4,6-triiodoisophthalic acid and aqueous methylamine according to the procedure of Example 64, part (a), and was obtained in the form of tan crystals, m.p. 321°–314° C. when recrystallized from aqueous dimethylformamide.

By replacing the methylamine by ammonia there can be obtained 5-amino-2,4,6-triiodoisophthalamide [C; R° is H₂NCO, Q is H, Z is NH₂].

b. 3′,5′-bis(Methylcarbomoyl)-2′,4′,6′-triiodooxalanilic Acid [B; R is CH₃NHCO, R′ and R″ are H, Y′ is single bond, Z is NHCH₃] was prepared from 5-amino-2.4.6-triiodo-N,N'-dimethylisophthalamide and ethyl oxalyl chloride according to the procedure described in Example 80, and was obtained in the form of a colorless solid, m.p. 275°–285° C.

By replacing the 5-amino-2,4,6-triiodo-N,N'-dimethylisophthalamide by 5-amino-2,4,6-triiodoisophthalamide there can be obtained 3′,5-40 -dicarbamoyl-2′,4′,6′-triiodooxalanilic acid [B; R is H₂NCO, R′ and R″ are H, Y′ is single bond, Z is NH₂].

EXAMPLE 83 a. 3-Nitro-5-(3,6,9-trioxadecanamido)benzoic Acid [G'; T is CH₃OCH₂CH₂OCH₂CH₂OCH₂, Z is OH].

A mixture of 14.6 g. of 3-amino-5-nitrobenzoic acid and 17.1 g. of 3,6,9-trioxadecanoic acid chloride in 200 ml. of dioxane was heated at reflux for 24 hours. The reaction mixture was concentrated to remove the solvent. The residue was dissolved in dilute sodium hydroxide and then acidified with hydrochloric acid. The resulting product (13.6 g., m.p. 130°C.) was recrystallized from acetonitrile to give 3-nitro-5-(3,6,9-trioxadecanamido)benzoic acid as a beige solid, m.p. 136°–137° C.

b. 3-Amino-5-(3,6,9-trioxadecanamido)benzoic Acid [H; T is CH₃OCH₂CH₂OCH₂CH₂OCH₂, Z is OH] was prepared by hydrogenation of 80 g. of 3-nitro-5-(3,6,9-trioxadecanamido)benzoic acid in absolute ethanol in the presence of palladium-on-charcoal catalyst. There was thus obtained 54.7 g. of 3-amino-5-(3,6,9-trioxadecanamido)benzoic acid, m.p. 130.5°–131° C. when recrystallized from isopropyl alcohol.

c. 3-Amino-2,4,6-triiodo-5-(3,6,9-trioxadecanamido)benzoic Acid [J; T is CH₃OCH₂CH₂OCH₂CH₂OCH₂, Z is OH] was prepared by iodination of 3-amino-5-(3,6,9-trioxadecanamido)benzoic acid with sodium iododichloride according to the procedure of Example 37, part (d), and was obtained in the form of a tan solid, m.p. 177°–178° C. when recrystallized from methanol and a methanol-benzene mixture.

d. 3-Amino-2,4,6-triiodo-5-(N-methyl-3,6,9-trioxadecanamido)-benzoic Acid [C; R° is H(CH₂OCH₂)₃CON(CH₃), Q is H, Z is OH] was prepared by methylation of 3-amino-2,4,6-triiodo-5-(3,6,9-trioxadecanamido)benzoic acid with dimethyl sulfate according to the procedure of Example 41, and was obtained as an amorphous pink solid, m.p. 100°–109° C. when recrystallized from methanol.

EXAMPLE 84 a. 3-Cyclopropylcarboxamido-5-nitrobenzoic Acid [G'; T is cyclopropyl, Z is OH].

Cyclopropanecarboxylic acid chloride (57.5 g.) was added over a 2 minute period to a solution of 91 g. of 3-amino-5-nitrobenzoic acid in dioxane at 70° C. The reaction mixture was refluxed for about 16 hours and the product isolated to give 89 g. of 3-cyclopropylcarboxamido-5-nitrobenzoic acid, m.p. 266°–266.5° C.

b. 3-Cyclopropylcarboxamido-5-aminobenzoic Acid [H; T is cyclopropyl, Z is Oh].

A solution prepared from 89.5 g. of 3-cyclopropylcarboxamido-5-nitrobenzoic acid and 142 ml. of 2.5N sodium hydroxide was hydrogenated in the presence of 3 g. of 10 percent palladium-on-carbon catalyst. The catalyst was removed by filtration and the filtrate acidified. The product was collected and dried to give 62.5 g. of 3-cyclopropylcarboxamido-5-aminobenzoic acid.

c. 3-Amino-5-(cyclopropylcarboxamido)-2,4,6-triiodobenzoic Acid [J; T is cyclopropyl, Z is OH].

To a solution of 62.1 g. of 3-cyclopropylcarboxamido-5-nitrobenzoic acid and 95 ml. of 3N hydrochloric acid in 750 ml. of water was added 330.5 ml. of 2.837N aqueous sodium iododichloride solution over a period of 27 minutes. The reaction mixture was heated at about 100° C. for several days, and the product was isolated and recrystallized from an isopropyl alcohol-methanol mixture to give 3-amino-5-(cyclopropylcarboxamido)-2,4,6-triiodobenozic acid, light tan solid, m.p. 224° C. (dec.).

d. 3-Amino-5-(N-methylcyclopropylcarboxamido)-2,4,6-triiodobenzoic Acid [C; R° is cyclopropyl-CON(CH₃), Q is H, Z is OH].

A solution of 59.8 g. of 3-amino-5-(cyclopropylcarboxamido)-2,4,6-triiodobenzoic acid in 320 ml. of 10 percent sodium hydroxide solution was treated with 25.2 g. of dimethyl sulfate in 50 ml. of acetone. The product was isolated and purified by conversion to the sodium salt and back to the free acid, and by recrystallization from isopropyl alcohol, to give 3-amino-5-(N-methylcyclopropylcarboxamido)-2,4,6-triiodobenzoic acid, colorless solid, m.p. 268°–271° C. (dec.).

e. 3-Glutarimido-5-(N-methylcyclopropylcarboxamido)-2,4,6-triiodobenzoic Acid [A; R is cyclopropyl-CON(CH₃), Y is CH₂CH₂CH₂, Z is OH] can be prepared by interacting 3-amino-5-(N-methylcyclopropylcarboxamido)-2,4,6-triiodobenzoic acid with glutaric anhydride according to the procedure of Example 1.

f. 3′-Carboxy-5′-(N-methylcyclopropylcarboxamido)-2′,4′,6′-triiodoglutaranilic Acid [B; R is cyclopropyl-CON(CH₃), R′ and R″ are H, Y′ is CH₂CH₂CH₂, Z is OH] can be prepared by hydrolyzing 3-glutarimido-5-(N-methylcyclopropylcarboxamido)-2,4,6-triiodobenzoic acid with dilute sodium hydroxide.

According to the foregoing procedures, cyclohexanecarboxylic acid chloride can be caused to react with 3-amino-5-nitrobenzoic acid and the resulting 3-cyclohexylcarboxamido-5-nitrobenzoic acid converted successively to 3-cyclohexylcarboxamido-5-aminobenzoic acid, 3-amino-5-(cyclohexylcarboxamido)-2,4,6-triiodobenzoic acid, 3-amino-5-(N-methylcyclohexylcarboxamido)-2,4,6-triiodobenzoic acid, 3-glutarimido-5-(N-methylcyclohexylcarboxamido)-2,4,6-triiodobenzoic acid [A; R is cyclohexyl CON(CH₃), Y is CH₂CH₂CH, Z is OH] and 3′-carboxy-5′-(N-methylcyclohexylcarboxamido)-2′,4′,6′-triiodoglutaranilic acid [B; R is cyclohexyl CON(CH₃), R′ and R″ are H, Y′ is CH₂CH₂CH, X is OH].

EXAMPLE 85

3-Glutarimido-2,4,6-triiodo-N,N-dimethylisophthalamic Acid [A; R is (CH₃)₂NCO, Y is CH₂CH₂CH₂, Z is OH], colorless solid, m.p. 275°–292° C., was prepared from 5-amino-2,4,6-triiodo-N,N-dimethylisophthalamic acid and glutaric anhydride according to the method of Example 1, and can be subsequently hydrolyzed with dilute sodium hydroxide to give 3′-carboxy-5′-(N,N-dimethylcarbamoyl)-2′,4′,6′-triiodoglutaranilic Acid [B; R is (CH₃)₂NCO, R′ and R″ are H, Y′ is CH₂CH₂CHZ is OH].

EXAMPLE 86 a. 3-Amino-2,4,6-triiodo-N,N-diethylbenzamide.

A mixture of 26.6 g. of 3-amino-2,4,6-triiodobenzoyl chloride, 515 ml. of diethylamine and 250 ml. of benzene was stirred at reflux for 20 minutes. The reaction mixture was kept at room temperature for 2 days, then filtered and the filtrate concentrated to remove solvent and excess diethylamine to give 28.7 g. of 3-amino-2,4,6-triiodo-N,N-diethylbenzamide as an amber glass. b. N-[3-(N,N-Diethylcarbamoyl)-2,4,6-triiodophenyl]succinimide [A; R is H, Y is $CH_2CH_2$, Z is $N(C_2H_5)$].

A mixture of 28.7 g. of 3-amino-2,4,6-triiodo-N,N-diethylbenzamide and 51.6 g. of succinic anhydride was heated to 115° C. Concentrated sulfuric acid (2.5 ml. ) was added, the mixture stirred for 2 to 3 minutes and then poured into 300–400 ml. of cold water with stirring. The mixture was treated with 300 ml. of 10 percent sodium hydroxide and the solid product collected to give N-[3-(N,N-diethylcarbamoyl)-2,4,6-triiodophenyl]succinimide, m.p. 211–218° C.

EXAMPLE 87 a. 3'-(N,N-Diethylcarbamoyl)-2',4',6'-triiodosuccinanilic Acid was prepared by treating a solution of N-[3-(N,N-diethylcarbamoyl)-2,4,6-triiodophenyl]succinimide in acetone with an excess of 10 percent aqueous sodium hydroxide. The solution was stirred for 1 hour at room temperature, concentrated to remove the solvent and acidified with dilute hydrochloric acid. The product was collected, purified by conversion to its sodium salt and reacidification, and recrystallized from ethyl acetate to give 3'-(N,N-diethylcarbamoyl)-2',4',6'-triiodosuccinanilic acid, colorless prisms, m.p. 202°–205° C. (dec. ).

b. 3'-(N,N-Diethylcarbamoyl)-2',4',6'-triiodo-N-methylsuccinanilic Acid [B; R is H, R' is $CH_3$, R'' is H, Y' is $CH_2CH_2$, Z is $N(CH_2H_5)_2$] was prepared by methylation of 3'-(N,N-diethylcarbamoyl)-2',4',6'-triiodosuccinanilic acid with dimethyl sulfate in potassium hydroxide according to the procedure of Example 41. The product was obtained as a colorless amorphous solid both in the free acid and sodium salt forms.

EXAMPLE 88

3'-(N,N-Diethylcarbamoyl)-2',4',6'-triiodo-N-ethylsuccinanilic Acid [B; R is H, R' is $C_2H_5$, R'' is H, Y' is $CH_2CH_2$, Z is $N(C_2H_5)_2$] was prepared by alkylation of 3'-(N,N-diethylcarbamoyl)-2',4',6'-triiodosuccinanilic acid with diethyl sulfate and potassium hydroxide in acetone solution. The product was obtained in the sodium salt form as a colorless amorphous solid from methanol-ether.

EXAMPLE 89 a. 3-Amino-2,4,6-triiodo-N,N-dimethylbenzamide.

A mixture of 69.88 g. of 3-amino-2,4,6-triiodobenzoyl chloride and 300 ml. of dimethylamine was stirred for 15 minutes. Sodium hydroxide (50 ml. 35 percent) and 50 ml. of water was added, and the reaction mixture was stirred for 1 hour. The solid product was collected and purified by conversion to its sodium salt form and reconversion to the free acid. The latter was recrystallized from ethanol to give 3-amino-2,4,6-triido-N,N-dimethylbenzamide, pale yellow solid, m.p. 165–167°c.

b. 3'-(N,N-Dimethylcarbamoyl)-2',4',6'-triiodoglutaranilic Acid [B; R, R' and R'' are H, Y' is $CH_2CH_2CH_2$, Z is $N(CH_3)_2$] was prepared by reacting 3-amino-2,4,6-triiodo-N,N-dimethylbenzamide with glutaric anhydride, according to the procedure of Example 1, and hydrolyzing the resulting N-[3-(N,N-dimethylcarbamoyl)-2,4,6-triiodophenyl]glutarimide [A; R is H, Y is $CH_2CH_2CH_2$, Z is $N(CH_3)_2$], m.p. 312°–315° C. The 3'-(N,N-dimethylcarbamoyl)-2',4',6'-triiodoglutaranilic acid was obtained as a colorless solid, m.p. 189°–192° C.

c. 3'-(N,N-Dimethylcarbamoyl)-2',4',6'-triiodo-N-methylglutaranilic Acid [B; R is H, R' is $CH_3$, R'' is H, Y' is $CH_2CH_2CH_2$, Z is $N(CH_3)_2$] was obtained by methylation of 3'-(N,N-dimethylcarbamoyl)-2',4',6'+triiodoglutaranilic acid with dimethyl sulfate according to the procedure of Example 41, and had the m.p. 205°–208° C. when recrystallized from ethyl acetate. The sodium salt form had the m.p. 191°–200° C.

The 3'-(N,N-dimethylcarbamoyl)-2',4',6'-triiodo-N-methylglutaranilic acid by fractional crystallization from acetonitrile could be separated into two isomers: Isomer A, light amber crystals, m.p. 201°204° C.; sodium salt, fine white powder, m.p. 226°–229° C.; and Isomer B, pale yellow crystals, m.p. 210°213° C.; sodium salt, fine colorless needles, m.p. 194°–210° C.; calcium salt, colorless powder.

EXAMPLE 90

3'-(Dimethylcarbamoyl)-2',4',6'-triiodo-N-ethylglutaranilic Acid [B; R is H, R' is $C_2H_5$, R'' is H, Y' is $CH_2CH_2CH_2$, Z is $N(CH_3)_2$] was prepared by ethylating 3'-(dimethylcarbamoyl)-2',4',6'-triiodoglutaranilic acid (Example 89b) with diethyl sulfate according to the procedure of Example 41, and was obtained in the form of colorless crystals, m.p. 180°–182° C. when recrystallized from ethyl acetate.

EXAMPLE 91

3-Glutarimido-2,4,6-triiodobenzamide [A; R is H, Y is $CH_2CH_2 Ch_2$, Z is $NH_2$].

A mixture of 100 g. of 3-glutarimido-2,4,6-triiodobenzoic acid and 200 ml. of thionyl chloride was refluxed for 90 minutes. The excess thionyl chloride was removed in vacuo and the last traces removed by boiling down with benzene. The residue of acid chloride was treated with 200 ml. of concentrated ammonium hydroxide and 200 ml. of water. The reaction mixture was stirred for 2 hours. The solid product was collected, dried and recrystallized from dimethylformamide with addition of a little acetic acid, and then from dioxane to give 3glutanimido-2,4,5-triiodbenzamide, colorless sold, m.p. 268°–275° C.

EXAMPLE 92 a. 3-Amino-2,4,6-triiodo-N-methylbenzamide [C; R° is H, Q is H, Z is $NHCH_3$] was prepared from the acid chloride of 3-amino-2,4,6-triiodobenzoic acid and aqueous methylamine, and was obtained in the form of a light yellow powder, m.p. 276°–278° C. when recrystallized from dioxane.

Acetylation of the latter compound provided 3-acetamido-2,4,6-triiodo-N-methylbenzamide [C; R° is H, Q is $COCH_3$, Z is $NHCH_3$], m.p. 290°–292° C.

b. 3-Succinimido-2,4,6-triiodo-N-methylbenzamide [A; R is H, Y is $CH_2CH_2$, Z is $NHCH_3$] was prepared from 3-amino-2,4,6triiodo-N-methylbenzamide or 3-acetamido-2,4,6triiodo-N-methylbenzamide and succinic anhydride according to the procedure of Example 1, and was obtained in the form of colorless crystals, m.p. 277°–284° C. when recrystallized from methanol.

EXAMPLE 93

3-glutarimido-2,4,6-triiodo-N-methylbenzamide [A; R is H, Y is $CH_2CH_2CH_2$, Z is $NHCH_3$] was prepared from 3-amino-2,4,6-triiodo-N-methylbenzamide or 3-acetamido-2,4,6and glutaric anhydride according to the procedure of Example 1, and was obtained in the form of a colorless solid, m.p. 234°–236° C. when recrystallized from acetic acid.

EXAMPLE 94 a 2',4',6'-Triiodo-3'-(methylcarbamoyl)glutaranilic Acid was prepared by hydrolysis of 3-glutarimido-2,4,6-triiodo-N-methyl benzamide with dilute sodium hydroxide, and was obtained in the form of fine colorless needles, m.p. 268°–270° C. when recrystallized from acetic acid.

b. 2',4',6'-Triiodo-3'-methylcarbamoyl)-N-methylglutaranilic Acid [B; R is H, R' is CH, R'' is H, Y' is $CH_2 cH_2CH_2$, Z is $NHCH_3$] was prepared by methylation of 2',4',6'-triiodo-3'(methylcarbamoyl)glutaranilic acid with dimethyl sulfate according to the procedure of Example 41, and was obtained in the form of a colorless solid, m.p. 164°–168° C. when recrystallized from ethyl acetate; sodium salt, m.p. 255°–256° C. (decompan. ).

EXAMPLE 95

2',4',6'-triiodo-3'-(methylcarbamoyl)succinanilic Acid was prepared by hydrolysis of 3-succinimido-2,4,6-triiodo-N-methylbenzamide (Example 92b) with dilute sodium hydroxide, and was obtained as a colorless solid, m.p. 246°–249° C. The latter can be N-methylated with dimethyl sulfate to produce 2',4',6'-triiodo-3'-(methylcarbamoyl)-N-methylsuccinanilic acid [B; R is H, R' is $CH_3$, R" is H, Y' is $CH_2CH_2$, Z is $NHCH_3$].

EXAMPLE 96 a. 3'-Carbomethoxy-2',4',6'-triiodosuccinanilic Acid was prepared from methyl 3-amino-2,4,6-triiodobenzoate and succinic anhydride, followed by mild alkaline hydrolysis of the resulting methyl 3-succinimido-2,4,6-triiodobenzoate [A; R is H, Y is $CH_2Ch_2$, Z is $OCH_3$], and was obtained as a colorless solid, m.p. 222°–223.5° C. (dec.).

b. 3'-Carbomethoxy-2',4',6'-triiodo-N-methylsuccininanilic Acid [B; R is H, R' is $CH_3$, R" is H, Y' is $CH_2CH_2$, Z is $OCH_3$] was prepared by methylation of 3'-carbomethoxy-2',4',6'-triiodosuccinanilic acid with dimethyl sulfate, and was obtained as a colorless solid, m.p. 191°–196.5° C.

EXAMPLE 97

3'-Carbomethoxy-2',4',6'-triiodo-N-ethylsuccinanilic Acid [B; R is H, R' is $CH_2CH_3$, R" is H, Y' is $CH_2CH_2$, Z is $OCH_3$] was prepared by ethylation of 3'-carbomethoxy-2',4',6'-triiodosuccinanilic acid with diethyl sulfate, and was obtained in the form of its sodium salt as a colorless amorphous solid.

EXAMPLE 98 a. 3'-Carbethoxy-2',4',6'-triiodoglutaranilic Acid was prepared from ethyl 3-amino-2,4,6-triiodobenzoate and glutaric anhydride, followed by mild alkaline hydrolysis of the resulting ethyl 3-glutarimido-2,4,6-triiodobenzoate [A; R is H, Y is $CH_2CH_2CH_2$, Z is $OC_2H_5$], and was obtained as a colorless solid, m.p. 159°–161° C.

b. 3'-Carbethoxy-2',4',6'-triiodo-N-methylglutaranilic Acid [B; R is H, R' is $CH_3$, R" is H, Y' is $CH_2CH_2CH_2$, Z is $OC_2H_5$] can be prepared by methylation of 3'-carbethoxy-2',4',6'-triiodoglutaranilic acid with dimethyl sulfate.

3,5-Diacetyl-2,4,6-triiodoaniline [C; R° is $CH_3CO$, Q is H, Z is $CH_3$] or 3,5-dibenzoyl-2,4,6-triiodoaniline [C; R° is $C_6H_5CO$, Q is H, Z is $C_6H_5$] (prepared by interacting the diacid chloride of 3-amino-2,4,6-triiodoisophthalic acid with methyllithium or phenyllithium, respectively) can be caused to react with glutaric anhydride according to the procedure of Example 1 to give, respectively, N-(3,5-diacetyl-2,4,6-triiodophenyl)glutarimide [A; R is $CH_3CO$, Y is $CH_2CH_2CH_2$, Z is $CH_3$] or N-(3,5-dibenzoyl-2,4,6-triiodophenyl)glutarimide [A; R is $C_6H_5CO$, Y is $CH_2CH_2Ch_2$, Z is $C_6H_5$], which in turn can be hydrolyzed with dilute sodium hydroxide to give, respectively, 3',5'-diacetyl-2',4',6'-triiodoglutaranilic acid [B; R is $CH_3CO$, R' and R" are H, Y' is $CH_2CH_2CH_2$, Z is $CH_3$] or 3',5'2',4',6'-triiodoglutaranilic acid [B; R is $C_6H_5CO$, R' and R" are H, Y' is $CH_2CH_2CH_2$, Z is $C_6H_5$].

EXAMPLE 99 a. 5-Glutarimido-2,4,6-triiodoisophthalamide [A; R is $NH_2CO$, Y is $CH_2CH_2CH_2$, Z is $NH_2$] can be prepared from 5-amino-2,4,6-triiodoisophthalamide (m.p. 305° C., decompn., prepared from 5-amino-2,4,6-triiodoisophthalic acid by treatment with thionyl chloride and then ammonium hydroxide) and glutaric anhydride.

b. 3',5'-Dicarbamoyl-2',4',6'-triiodoglutaranilic Acid [B; R is $H_2NCO$, R' and R" are H, Y' is $CH_2CH_2CH_2$, Z is $NH_2$] can be prepared by mild alkaline hydrolysis of 5-glutarimido-2,4,6-triiodoisophthalamide.

EXAMPLE 100 a. 5-Glutarimido-2,4,6-triiodo-N,N'-dimethylisophthalamide [A; R is $CH_3NHCO$, Y is $CH_2CH_2CH_2$, Z is $NHCH_3$] was prepared from 5-amino-2,4,6-triiodo-N,N'-dimethylisophthalamide (Example 82a) and glutaric anhydride, and was obtained in the form of colorless flakes, m.p. 304°–314° C.

b. 2',4',6'-Triiodo-3',5'-bis(methylcarbamoyl)glutaranilic Acid [B; R is $CH_3NHCO$, R' and R" are H, Y' is $CH_2CH_2CH_2$, Z is $NHCH_3$], colorless powder, m.p. 267°–271° C. (decompn.), was prepared by mild alkaline hydrolysis of 5-glutarimido-2,4,6-triiodo-N,N'-dimethylisophthalamide.

EXAMPLE 101

3',5'-bis(Dimethylcarbamoyl)-2',4',6'-N-methyltriiodooxalanilic Acid [B; R is $(CH_3)_2NCO$, R' is $CH_3$, R" is H, Y' is single bond, Z is $N(CH_3)_2$], cis-isomer, colorless needles, m.p. 306°–310° C.; and trans-isomer, colorless needles, m.p. 253°–260° C., were prepared by methylation (dimethyl sulfate) of Isomers A and B, respectively, of 3',5'-bis(dimethylcarbamoyl)-2',4',6'-triiodooxalanilic acid (Example 80).

EXAMPLE 102 a. 5-Maleimido-2,4,6-triiodo-N,N,N',N'-tetramethylisophthalamide [A; R is $(CH_3)_2NCO$, Y is $CH=CH$, Z is $N(CH_3)_2$], cis-isomer, colorless needles, m.p. above 360° C.; and trans-isomer, yellow crystals, m.p. above 360° C., were prepared from 5-amino-2,4,6-triiodo-N,N,N',N'-tetramethylisophthalamide and maleic anhydride.

b. 3',5'-bis(Dimethylcarbamoyl)-2',4',6'-triiodomaleanilic Acid [B; R is $(CH_3)_2NCO$, R' and R" are H, Y' is $CH=CH$, Z is $N(CH_3)_2$], cis-isomer, colorless needles, m.p. 262°–265° C.; and trans-isomer, colorless plates, m.p. 267°–271° C., were prepared by mild alkaline hydrolysis of the cis- and trans-ismoers, respectively, of 5-maleimido-2,4,6-triiodo-N,N,N',N'-tetramethylisophthalamide.

EXAMPLE 103 a. 3-Glutarimido-2,4,6-triiodo-N-ethylbenzamide [A; R is H, Y is $CH_2CH_2CH_2$, Z is $NHC_2H_5$], colorless powder, m.p. 227°–229° C., was prepared from 3-amino-2,4,6-triiodo-N-ethylbenzamide (prepared from the acid chloride of 3-amino-2,4,6-triiodobenzoic acid and aqueous ethylamine) and glutaric anhydride.

b. 3'-(Ethylcarbamoyl)-2',4',6'-triiodoglutaranilic Acid [B; R, R' and R" are H, Y is $CH_2CH_2CH_2$, Z is $NHC_2H_5$], colorless needles, m.p. 262°–265° C., was prepared by mild alkaline hydrolysis of 3-glutarimido-2,4,6-triiodo-N-ethylbenzamide.

c. 3'-(Ethylcarbamoyl)-2',4',6'-triiodo-N-methylglutaranilic Acid [B; R is H, R' is $CH_3$, R" is H, Y is $CH_2CH_2CH_2$, Z is $NHC_2H_5$], colorless powder, m.p. 226°–235° C., was prepared by methylation (dimethyl sulfate) of 3'-(ethylcarbamoyl)-2',4',6'-triiodoglutaranilic acid.

EXAMPLE 104 a. 3'-(Dimethylcarbamoyl)-2',4',6'-triiodooxalanilic Acid [B; R, R' and R" are H, Y' is single bond, Z is $N(CH_3)_2$], colorless powder, m.p. 153°–158° C. (decompn.), was prepared from 3-amino-2,4,6-triiodo-N,N-dimethylbenzamide (Example 89a) and ethyl oxalyl chloride, followed by alkaline hydrolysis of the resulting ethyl ester.

b. 3'-(Dimethylcarbamoyl)-2',4',6'-triiodo-N-methyloxanilic Acid [B; R is H, R' is $CH_3$, R" is H, Y' is single bond, Z is $N(CH_3)_2$], colorless crystals, m.p. 179°–181° C. (decompn.), was prepared by methylation (dimethyl sulfate) of 3'-(dimethylcarbamoyl)-2',4',6'-triiodooxalanilic acid.

EXAMPLE 105 a. 3-Succinimido-2,4,6-triiodo-N,N-dimethylbenzamide [A; R is H, Y is $CH_2CH_2$, Z is $N(CH_3)_2$], colorless crystals, m.p. 263–266°C., was prepared from 3-amino-2,4,6-triiodo-N,N-dimethylbenzamide (Example 89a) and succinic anhydride.

b. 3'-(Dimethylcarbamoyl)-2',4',6'-triiodosuccinanilic Acid [B; R, R' and R'' are H, Y' is $CH_2CH_2$, Z is $N(CH_3)_2$], colorless prisms, m.p. 166°–170° C., was prepared by mild alkaline hydrolysis of 3-succinimido-2,4,6-triiodo-N,N-dimethylbenzamide.

c. 3'-(Dimethylcarbamoyl)-2',4',6'-triiodo-N-methylsuccinanilic Acid [B; R is H, R' is $CH_3$, R'' is H, Y' is $CH_2CH_2$, Z is $N(CH_3)_2$], Isomer A, colorless solid, m.p. 186°–190° C.; and Isomer B, colorless powder, m.p. 188°–220° C., was prepared by methylation (dimethyl sulfate) of 3'-(dimethylcarbamoyl)-2',4',6'-triiodosuccinanilic acid.

EXAMPLE 106 a. 3-Glutarimido-2,4,6-triiodo-N,N-diethylbenzamide [A; R is H, Y is $CH_2CH_2CH_2$, Z is $N(C_2H_5)_2$], colorless prisms, m.p. 236°–239° C., was prepared from 3-amino-2,4,6-triiodo-N,N-diethylbenzamide (Example 86a) and glutaric anhydride.

b. 3'-(Diethylcarbamoyl)-2',4',6'-triiodoglutaranilic Acid [B; R, R' and R'' are H, Y' is $CH_2CH_2CH_2$, Z is $N(C_2H_5)_2$], colorless prisms, m.p. 207°–211° C., was prepared by mild alkaline hydrolysis of 3-glutarimido-2,4,6-triiodo-N,N-diethylbenzamide.

c. 3'-(Diethylcarbamoyl)-2',4',6'-triiodo-N-methylglutaranilic Acid [B; R is H, R' is $CH_3$, R'' is H, Y' is $CH_2CH_2CH_2$, Z is $N(C_2H_5)_2$], colorless powder, m.p. 187°–189° C., was prepared by methylation (dimethyl sulfate) of 3'-(diethylcarbamoyl)-2',4',6'-triiodoglutaranilic acid.

EXAMPLE 107 a. 4-[2,4,6-Triiodo-3-(succinimido)benzoyl]morpholine [A; R is H, Y is $CH_2CH_2$, Z is $N(CH_2)_4O$], colorless needles, m.p. 180°–187° C., was prepared by reacting 2,4,6-triiodo-3-succinimidobenzoic acid (Example 13) with thionyl chloride and then with aqueous morpholine.

b. 2',4',6'-Triiodo-3'-(morpholinocarbonyl)succinanilic Acid [B; R, R' and R'' are H, Y' is $CH_2CH_2$, Z is $N(CH_2)_4O$], colorless cubes, m.p. 246°–249° C., was prepared by mild alkaline hydrolysis of 4-[2,4,6-triiodo-3-(succinimido)benzoyl]morpholine.

c. 2',4',6'-Triiodo-3'-(morpholinocarbonyl)-N-methylsuccinanilic Acid [B; R is H, R' is $CH_3$, R'' is H, Y' is $CH_2CH_2$, Z is $N(CH_2)_4O$] can be prepared by methylation (dimethyl sulfate) of 2',4',6'-triiodo-3'-(morpholinocarbonyl)-succinanilic acid.

EXAMPLE 108 a. 4-[3-(Glutarimido)-2,4,6-triiodobenzoyl]morpholine [A; R is H, Y is $CH_2CH_2CH_2$, Z is $N(CH_2)_4O$], colorless needles, m.p. 293°–296°C., was prepared by reacting 2,4,6-triiodo-3-glutarimidobenzoic acid (Example 16) with thionyl chloride and then with aqueous morpholine.

b. 2',4', 6'-Triiodo-3'-(morpholinocarbonyl)glutaranilic Acid ]B; R, R' and R'' are H, Y' is $CH_2CH_2CH_2$, Z is N $(CH_2)_4O$], colorless needles, m.p. 182-186°C., was prepared by milk alkaline hydrolysis of 4-[3-(glutarimido)-2,4,6-triiodobenzoyl]morpholine.

c. 2',4',6'-Triiodo-3'-(morpholinocarbonyl)-N-methylglutaranilic Acid [B; R is H, R' is $CH_3$, R'' is H, Y' is $CH_2CH_2CH_2$, Z is $N(CH_2)_4O$] was prepared by methylation (dimethyl sulfate) of 2',4',6'-triiodo-3'-(morpholinocarbonyl)glutaranilic acid, and obtained as a mixture of isomers, m.p. 186°–190° C., which could be separated into two isomers, Isomer A, colorless powder, m.p. 191°–194° C., and Isomer B, colorless needles, m.p. 174°–183° C., sodium salt, colorless powder, m.p. 197°–207° C.

EXAMPLE 109 a. 3,5-Di(succinimido)-2,4,6-triiodo-N,N-dimethylbenzamide [A; R is succinimido, Y is $CH_2CH_2$, Z is $N(CH_3)_2$], yellow prisms, m.p. above 330° C., was prepared by reacting 3,5-di(succinimido)-2,4,6-triiodobenzoic acid (Example 76) with with thionyl chloride and then with aqueous dimethylamine.

b. N,N'-[5-(Dimethylcarbamoyl)-2,4,6-triiodo-m-phenylene]bis-[succinamic acid] [B; R is $HOOC(CH_2)_2CONH$, R' and R'' are H, Y' is $CH_2CH_2$, Z is $N(CH_3)_2$], colorless crystals, m.p. 228°–230° C. (decompn.), was prepared by mild alkaline hydrolysis of 3,5 - di - (succinimido) - 2,4,6 - triiodo - N,N-dimethylbenzamide.

EXAMPLE 110

3-{3-[(2-Carboxyethyl)sulfonyl]propionamido}-2,4,6-triiodo-5-(N-methylacetamido)benzoic Acid [B; R is $CH_3CON(CH_3)$, R' and R'' are H, Y' is $CH_2CH_2SO_2CH_2CH_2$, Z is OH].

To a solution of 29.54 g. of 3-[3-(2-carboxyethylthio)-propionamido]-2,4,6-triiodo-5-(N-methylacetamido)benzoic acid (Example 56) in 175 ml. of glacial acetic acid at room temperature was added in portions 8.69 g. of an aqueous solution containing 2.695 g. of hydrogen peroxide. The mixture was heated on a steam beam for 1 hour, and then concentrated in vacuo to remove the solvents. The residue was dissolved in aqueous sodium hydroxide, decolorized with activated charcoal and reprecipitated with hydrochloric acid. The product was collected and dried to give 17.75 g. of 3-{3-[(2-carboxyethyl)sulfonyl]propionamido}-2, 4, 6-triiodo-5-solid, m.p. 234°–241° C. (decompn.).

EXAMPLE 111 a. 2,4,6-Triiodo-3-{3-[2-(methoxycarbonyl)ethylthio]propionamido}-5-(N-ethylacetamido)benzoic Acid {B; R is $CH_3CON(C_2H_5)$, R' is H, R'' is $CH_3$, Y' is $CH_2CH_2SCH_2CH_2$, Z is OH], colorless powder, m.p. 152°–170° C., was prepared from 3-amino-5-(N-ethylacetamido)-2,4,6-triiodobenzoic acid and $ClCOCH_2CH_2SCH_2CH_2COOCH_3$ according to the procedure of Example 55.

b. 3-[3-(2-Carboxyethylthio)propionamido]-2,4,6-triiodo-5-(N-ethylacetamido)benzoic Acid [B; R is $CH_3CON(C_2H_5)$, R' and R'' are H, Y' is $CH_2CH_2SCH_2CH_2$, Z is OH], colorless powder, m.p. 190°–199° C., was prepared by alkaline hydrolysis of 2,4,6-triiodo-3-{3-[2-(methoxycarbonyl)ethylthio]propionamido]-5-(N-ethylacet-amido)benzoic acid according to the procedure of Example 56.

c. 3-[3-(2-Carboxyethylsulfonyl)propionamido]-2,4,6-triiodo-5-(N-ethylacetamido)benzoic Acid [B; R is $CH_3CON(C_2H_5)$, R' and R'' are H, Y' is $CH_2CH_2SO_2CH_2CH_2$, Z is OH] can be prepared by treating 3-[3-(2-carboxyethylthio)propionamido]-2,4,6-triiodo-5-(N-ethylacetamido)benzoic acid with hydrogen peroxide by the procedure described in Example 110.

EXAMPLE 112 a. 2,4,6-Triiodo-5-maleimidoisophthalic Acid [A; R is HOOC, Y is CH = CH, Z is OH], tan prisms, m.p. above 328° C. (decompn.), was prepared from 5-amino-2,4,6-triiodoisophthalic acid and maleic anhydride.

b. 2',4',6'-Triiodo-3',5'-dicarboxymaleanilic Acid [B; R is HOOC, R' and R'' are H, Y' is CH = CH, Z is OH] can be prepared by mild acid hydrolysis of 2,4,6-triiodo-5-maleimidoisophthalic acid.

I claim:

1. A compound of the formula

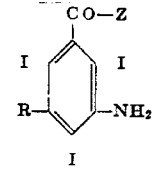

I wherein R is (T—CO)N(lower-alkyl), where T is hydrogen, cycloalkyl of three to six ring members, or alkyl of one to eight carbon atoms optionally interrupted by from one to four oxygen atoms, each oxygen, when more than one, being separated by at least two carbon atoms, and Z is $NH_2$, NH(lower-alkyl), N(lower-alkyl)$_2$, morpholino, piperidino or pyrrolidino.

2. 3-Amino-2,4,6-triiodo-5-(N-methylacetamido)-N,N-dimethylbenzamide, according to claim 1 wherein R is N-methylacetamido and Z is dimethylamino.

3. 4-[3-Amino-2,4,6-triiodo-5-(N-methylacetamido)-benzoyl]morpholine, according to Claim 1 wherein R is N-methyl-acetamido and Z is morpholino.

* * * * *